(12) United States Patent
Fells

(10) Patent No.: US 11,010,452 B2
(45) Date of Patent: May 18, 2021

(54) CONTENT PROTECTION

(71) Applicant: Julian Fells, Surbiton Greater London (GB)

(72) Inventor: Julian Fells, London (GB)

(73) Assignee: MINING IP LIMITED, Kent (GB)

( * ) Notice: Subject to any disclaimer, the term of this patent is extended or adjusted under 35 U.S.C. 154(b) by 770 days.

(21) Appl. No.: 14/440,157

(22) PCT Filed: Nov. 4, 2013

(86) PCT No.: PCT/GB2013/052877
§ 371 (c)(1),
(2) Date: May 1, 2015

(87) PCT Pub. No.: WO2014/068336
PCT Pub. Date: May 8, 2014

(65) Prior Publication Data
US 2015/0254435 A1   Sep. 10, 2015

(30) Foreign Application Priority Data

Nov. 4, 2012 (GB) .................................. 1219813
Oct. 17, 2013 (GB) .................................. 1318361

(51) Int. Cl.
*G06F 21/10* (2013.01)
*G06F 21/16* (2013.01)
*G06F 21/62* (2013.01)

(52) U.S. Cl.
CPC ............. *G06F 21/10* (2013.01); *G06F 21/16* (2013.01); *G06F 21/6218* (2013.01); *G06F 2221/0733* (2013.01)

(58) Field of Classification Search
CPC ................. G06F 21/10; G06F 21/6218; G06F 2221/0733
(Continued)

(56) References Cited

U.S. PATENT DOCUMENTS 6,031,914 A * 2/2000 Tewfik .................. G06T 1/0028
341/4
6,691,229 B1 * 2/2004 Nelson .................... G06F 21/16
713/168
(Continued)

FOREIGN PATENT DOCUMENTS

WO   2009031082   3/2009
WO   2009034504   3/2009
WO   2010081931   7/2010

OTHER PUBLICATIONS

GB Application No. 1318361.1, Examination Report, dated Feb. 28, 2020, 9 pages.

*Primary Examiner* — Patrick McAtee
*Assistant Examiner* — Edgar R Martinez-Hernandez
(74) *Attorney, Agent, or Firm* — Lathrop GPM LLP

(57) ABSTRACT

The information marked on one electronic content is compared to that marked on another electronic content in order to determine if either are unauthorised. There are a number of ways of comparing the information in order to make this determination. One way is to detect if two electronic content accessed by the same device have information associated with different users. Another way is to detect if two electronic content accessed by different devices have information associated with a single user. A further way is to use the time or sequence of access in conjunction with the information. Other ways of determining unauthorised content are disclosed.

27 Claims, 15 Drawing Sheets

(58) Field of Classification Search
USPC .......................................................... 705/51
See application file for complete search history.

(56) References Cited

U.S. PATENT DOCUMENTS

| | | | | |
|---|---|---|---|---|
| 7,349,390 | B2* | 3/2008 | Igarashi | H04L 1/1642 370/331 |
| 7,478,432 | B2* | 1/2009 | Echizen | H04L 63/0428 705/51 |
| 7,757,089 | B2* | 7/2010 | Kusuda | G06T 1/0071 713/176 |
| 7,769,479 | B2* | 8/2010 | Iida | G11B 20/12 700/94 |
| 7,802,306 | B1 | 9/2010 | Adams | |
| 8,077,865 | B2* | 12/2011 | Matsushima | G06F 21/10 380/28 |
| 8,510,767 | B2* | 8/2013 | Weinblatt | H04H 20/14 725/10 |
| 8,687,942 | B2* | 4/2014 | Mae | G11B 27/034 386/241 |
| 2003/0140066 | A1 | 7/2003 | Monahan | |
| 2004/0184065 | A1 | 9/2004 | Guan et al. | |
| 2005/0125428 | A1* | 6/2005 | Kang | G11B 27/3027 |
| 2005/0232595 | A1* | 10/2005 | Hirai | G06F 21/10 386/252 |
| 2006/0062073 | A1* | 3/2006 | Kitani | G06F 21/10 365/232 |
| 2007/0047819 | A1* | 3/2007 | Hull | G06K 9/00456 382/190 |
| 2007/0110237 | A1* | 5/2007 | Tehranchi | H04N 1/32272 380/201 |
| 2007/0294544 | A1* | 12/2007 | Ishikawa | G06F 21/10 713/193 |
| 2008/0033913 | A1* | 2/2008 | Winburn | G06F 21/10 |
| 2008/0057880 | A1* | 3/2008 | Copeland | H04B 7/0691 455/101 |
| 2008/0059532 | A1* | 3/2008 | Kazmi | H04L 65/4069 |
| 2008/0240435 | A1* | 10/2008 | Celik | G06T 1/0028 380/255 |
| 2008/0295182 | A1* | 11/2008 | Ogai | G06F 21/10 726/29 |
| 2009/0007279 | A1* | 1/2009 | Alkove | G06F 21/10 726/28 |
| 2009/0030651 | A1* | 1/2009 | Wold | G06F 21/10 702/179 |
| 2009/0055650 | A1* | 2/2009 | Nakano | G11B 20/00253 713/176 |
| 2009/0171790 | A1* | 7/2009 | Nagarajayya | G06Q 30/02 705/14.61 |
| 2009/0249382 | A1* | 10/2009 | Weinblatt | H04H 60/375 725/12 |
| 2010/0287201 | A1* | 11/2010 | Damstra | G06F 21/10 707/780 |
| 2012/0017091 | A1* | 1/2012 | Petrovic | H04N 1/32203 713/176 |
| 2012/0210233 | A1* | 8/2012 | Davis | G06Q 30/0631 715/727 |
| 2014/0075466 | A1 | 3/2014 | Zhao | |
| 2017/0055042 | A1 | 2/2017 | Zhao | |

* cited by examiner

CONTENT PROTECTION

BACKGROUND

Unauthorised sharing of music and video content is one of the greatest challenges currently facing the media industry. Every year vast numbers of files are illegally shared, denying copyright owners vital revenue. Some estimates suggest that only a small fraction of music and video acquired is purchased legitimately, but it has been difficult to ascertain the exact level of unauthorised copying. Unauthorised file sharing also extends across other electronic content types including photographs, electronic artwork and electronic books. Digital content presents a particular problem in that an end-user can make identical copies. This means that there is no degradation in the quality of the copy compared to the original, allowing people to make copies of copies indefinitely. It also means that techniques which rely on analogue recording equipment making an inexact copy are ineffective.

Industry has tried a number of methods of implementing digital rights management (DRM) techniques. These use encryption and codes to restrict how, when and by what device electronic content is played. However, a side-effect of DRM is that it can prevent users from doing legitimate things, such as making back-up copies of purchased electronic content or playing their electronic content on different devices (e.g. their home stereo, car stereo and personal music player). As a result DRM has not been popular with consumers and a number of companies have stopped using it.

Digital watermarks have been used to mark copyrighted electronic content with an imperceptible code which identifies the copyright owner or the recipient. These can provide evidence when a copyright infringement has been discovered. However there is still a need to find grounds of suspicion in order to make an attempt to gather this evidence.

Further techniques for detecting unauthorized copying or use of content are disclosed in U.S. Patent Application Publication No. 2003/0140066 A1 ("Matsushita"), U.S. Patent Application Publication No. 2005/0232595 A1 ("Hirai") and U.S. Patent Application Publication No. 2006/0062073 A1 ("Kitani").

Matsushita discloses a method for customizing a copyrighted digital work. In this method, a customized version of the content is created using frames from either a first version of the work or second version of the work. When an unauthorized copy of the work is discovered, the distributor can read the enforcement data by comparing each frame with the reference copies of the first and second version of the work (thus creating a binary sequence of data, e.g. 0 for a frame from the first version, 1 for a frame from the second version). This method therefore uses reference copies of the work to determine the enforcement data.

Hirai discloses a method for limiting the number of copies a user may make of a disc (such as a DVD). A recording apparatus reads the International Standard Recording Code (ISRC) from a disc and stores it in memory. If the ISRC has not been previously stored, then the recording apparatus allows the user to make one copy of the disc. However, if the ISRC has been previously stored in the memory, the recording apparatus prevents the user from making further copies of the disc. The ISRC is content specific (not copy specific), such that the user may not simply use another copy of the same content.

Kitani discloses a method of protecting discs by embedding title information in a watermark in the video content, and also storing the title information in another area of the disc. Reproduction of the disc is prohibited if the two don't match. This disclosure therefore relates to comparing information from two parts of the same copy of content.

Further prior art methods, such as in U.S. Patent Application Publication No. 2003/0140066 A1 ("Mohan"), U.S. Patent Application Publication No. 2009/0030651 A1 ("Wold"), U.S. Patent Application Publication No. 2007/0294544 A1 ("Ishikawa") and U.S. Patent Application Publication No. 2008/0033913 A1 ("Winburn") all use fingerprinting methods. Fingerprinting is a method of generating a code by performing a mathematical operation on the content, which may be used for authentication by comparing it to a database. The fingerprint is associated with the content, but the content itself is not modified by the fingerprinting process and no information is added to it.

There is therefore a need for a system and method of monitoring and detecting unauthorised copying of electronic content, which alleviates some or all of the above problems.

SUMMARY

This summary is not intended to limit the scope of the invention, nor identify essential features of the invention. Instead it introduces concepts in a simplified form, which are expanded upon in the detailed description.

There is provided a method of detecting unauthorised content for use with a first electronic content marked with a first information and a second electronic content marked with a second information, the method comprising the step of sending the first information so as to cause a comparison of the first information from the first electronic content and the second information from the second electronic content to be made.

There is provided a method of detecting unauthorised content for use with a first electronic content marked with a first information and a second electronic content marked with a second information, the method comprising the step of receiving an indication of a result at least partly based on a comparison of the first information from the first electronic content and the second information from the second electronic content.

There is provided a method of detecting unauthorised content for use with a first electronic content marked with a first information and a second electronic content marked with a second information, the method comprising the step of comparing the first information from the first electronic content and the second information from the second electronic content.

There is provided a method of detecting unauthorised content for use with a first electronic content marked with a first information and a second electronic content marked with a second information, the method comprising the step of sending the first information for the purpose of detecting unauthorised content on the basis of a comparison of the first information from a first electronic content and a second information from the second electronic content.

The method may comprise the step of receiving the first electronic content marked with the first information. The method may comprise the step of receiving the second electronic content marked with the second information. The method may comprise the step of sending the second information to the same destination as the first information. The method may comprise the step of restricting access to electronic content in dependence on the comparison.

There is provided a system for detecting unauthorised content for use with a comparator, a first electronic content marked with a first information and a second electronic content marked with a second information, the system comprising a first transmitter, configured to send the first information to the comparator; wherein the comparator is configured to provide a result at least partly based on a comparison of the first information from the first electronic content and the second information from the second electronic content.

The system may comprise a first receiver coupled to the first transmitter, configured to receive the first electronic content marked with the first information. The first receiver may be configured to receive the second electronic content marked with the second information. The first transmitter may be configured to send the second information to the comparator.

The system may comprise a first receiver coupled to the first transmitter, configured to receive the first electronic content marked with the first information. The system may comprise a second receiver configured to receive the second electronic content marked with the second information. The system may comprise a second transmitter coupled to the second receiver, configured to send the second information to the comparator.

There is provided a system for detecting unauthorised content for use with a first electronic content marked with a first information and a second electronic content marked with a second information, the system comprising a comparator, configured to provide a result at least partly based on a comparison of the first information from the first electronic content and the second information from the second electronic content.

The system may comprise a first receiver configured to receive the first electronic content marked with the first information. The system may comprise a first transmitter coupled to the first receiver, configured to send the first information to the comparator.

The system may comprise a restrictor configured to restrict access to electronic content in dependence on the result.

There is provided a system for detecting unauthorised content for use with a comparator, a first electronic content marked with a first information and a second electronic content marked with a second information, the system comprising a receiver, configured to receive a result at least partly based on a comparison of the first information from the first electronic content and the second information from the second electronic content. The system may comprise an actioner coupled to the receiver, configured to act in dependence on the result.

Unauthorised content may be determined if at least the first information and the second information are different. The first electronic content and the second electronic content may be from or destined for the same device. Unauthorised content may be determined if at least a part of the first information and a part of the second information are the same. Unauthorised content may be determined if additionally, the first electronic content and the second electronic content are accessed at the same time. The first electronic content and the second electronic content may be from or destined for different devices.

There may be a plurality of comparisons of information from at least three electronic content. Unauthorised content may be determined if the number of matches or mismatches as appropriate exceeds a particular number or proportion. Unauthorised content may be determined if additionally the travel time between the location the first electronic content is accessed and the location the second electronic content is accessed is greater than the time between when the first electronic content is accessed and when the second electronic content is accessed. The allowable order of which the first electronic content and the second electronic content may be accessed may be determined by the first information and the second information. The allowable time at which the first electronic content or the second electronic content may be accessed may be determined by the first information and the second information. The first information may comprise a first code, such that the first electronic content is marked with a first data which maps to the first code. The second information may comprise a second code, such that the second electronic content is marked with a second data which maps to the second code. The comparison may be a comparison of the first code and the second code.

The first electronic content marked with the first information may be from an end-user device. The second electronic content marked with the second information may be from an end-user device. The first electronic content marked with the first information may be authorised to be played on at least two end-user devices. The second electronic content marked with the second information may be authorised to be played on at least two end-user devices. The first electronic content may have a different authorised user to the second electronic content. The first electronic content may be separate from the second electronic content. The comparing function may be separate from the first electronic content and the second electronic content.

The first electronic content and/or the second electronic content may be non-executable. The first information and/or the second information may have more than two possible states. The first electronic content and/or the second electronic content may be marked with a digital watermark. The first electronic content and the second electronic content may be capable of being consumed independently of each other. The first electronic content and the second electronic content may have different content. There may be no prior knowledge of whether the first electronic content is authorised or unauthorised. There may be no prior knowledge of whether the second electronic content is unauthorised or authorised. The first information may be dependent on the identity of an authorised user of the first electronic content. The second information may be dependent on the identity of an authorised user of the second electronic content.

There is provided a system for detecting unauthorised content for use with a comparator, a first electronic content marked with a first information and a second electronic content marked with a second information, the system comprising transmitting means for sending the first information to the comparator; wherein the comparator has comparison means for providing a result at least partly based on a comparison of the first information from the first electronic content and the second information from the second electronic content.

There is provided a system for detecting unauthorised content for use with a first electronic content marked with a first information and a second electronic content marked with a second information, the system comprising comparison means for providing a result at least partly based on a comparison of the first information from the first electronic content and the second information from the second electronic content.

There is provided a component for an electronic content player configured to detect unauthorised content, for use with a first electronic content marked with a first information and a second electronic content marked with a second information, the component comprising a comparator configured to provide a result at least partly based on a comparison of the first information from the first electronic content and the second information from the second electronic content.

There is provided an electronic content player configured to detect unauthorised content, for use with a first electronic content marked with a first information and a second electronic content marked with second information, the electronic content player comprising a comparator configured to provide a result at least partly based on a comparison of the first information from the first electronic content and the second information from the second electronic content.

There is provided a computer program, propagating signal or computer readable media comprising any of the above.

There is provided a propagating signal for the detection of unauthorised content, derived from a first electronic content marked with a first information and a second electronic content marked with a second information, the signal comprising a result at least partly based on a comparison of the first information from the first electronic content and the second information from the second electronic content.

These features, systems and methods have the advantage that it is possible to determine unauthorised content from information marked on two or more electronic content. This means it is possible to detect unauthorised content without restricting its use to a single device. It also allows users to make copies for backup purposes. Further the techniques are robust against persons trying to defeat them by faking device serial numbers or faking the device's internal clock. It is also possible to detect unauthorised content without first identifying the user, though it may be desirable to identify the user for enforcement action. The advantages of the invention are numerous and far broader than the limited set recited here.

These concepts, features and steps may be selected and combined as appropriate. They may also be combined with other aspects of the invention. There are many methods, systems, devices, components and computer programs that may be used to implement these concepts, as will be appreciated from the following drawings and description.

DETAILED DESCRIPTION

The following embodiments are believed to be the best examples of how the invention may be put into practice. However other examples are possible and this description is not intended to limit the scope of the invention.

Figure 1:
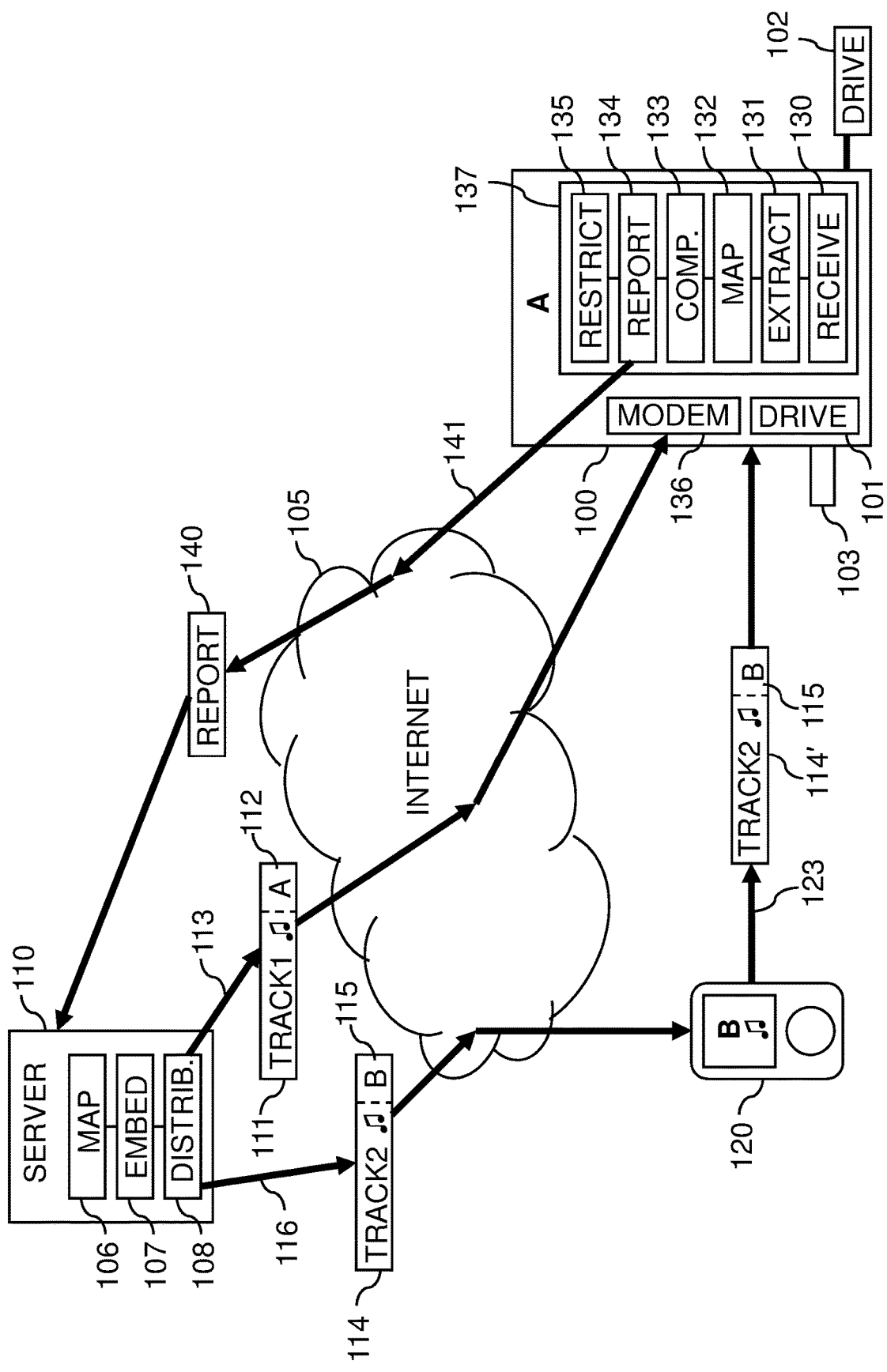
FIG. 1 shows a system for detecting unauthorised content and its operation.

FIG. 1 shows an example system of the invention and its operation. In order to download music, a user first sets up an account. Each account is assigned an account code, which may be unknown to the users and different from any account number used in servicing their account. The account code may be unique or semi-unique. Typically it would not be possible for someone who discovered an account code to identify the user as the relationship between account codes and users would be kept confidential. The music is distributed to users in a digital form from a server 110 comprising: a mapper 106, an embedder 107 and a distributor 108. The mapper 106 is used to map the user's account code to an embedded code. The embedder 107 is used to embed each embedded code within each track by digitally watermarking it. Thus each track 111, 114 downloaded is marked with information representing the account code 112, 115 of its respective authorised user. Other information may also be marked on the tracks. The distributor 108 sends each marked track 111, 114 to the requesting user device 100, 120 by download over the internet 105. The user devices 100, 120 may be referred to as end-user devices, because they are devices used by end-users of the content, as opposed to those involved in the creation, manufacture, publication and distribution of the content. This is irrespective of whether the content was acquired legitimately or not. It will be appreciated that although the examples reference music tracks, any type of electronic content or a combination of different types of electronic content are equally applicable.

The embedded codes may be hidden as a digital watermark within the audio signal itself in a way such that it is imperceptible when played. This can be achieved by a large number of ways known in the art. For example, a common technique is to use a spread spectrum technique. In one such example, the embedded code is modulated with a pseudo random sequence to generate a noise signal. This noise signal is applied to the audio signal to generate the watermarked signal. This may occur in the time domain or a transform domain (e.g. frequency domain or wavelet transform domain). The embedded code is recovered by correlation of the watermarked signal with the pseudo random sequence. However, there are numerous other watermarking techniques known in the art which are equally applicable. Should a music track with a digital watermark be duplicated, the copy will also bear the same watermark, and hence the same embedded code. The watermark being embedded within the signal rather than simply within the audio file may survive being converted from one audio format to another (e.g. from WAV to AAC or MP3). A robust watermark will remain if the signal is played on one audio player and the resulting sound recorded on a separate audio recorder. The watermark typically has information which is more than simply the presence or absence of the watermark (i.e. more than two states or more than one bit of information).

In this example, an electronic device 100 owned by user A is used to download 113 a music track 111 from server 110. The track 111 is marked with the account code 112 of user A. The electronic device 100 is a laptop computer with processor 137, internal disk drive 101, external disk drive 102, USB memory stick 103, and modem 136 for sending and receiving information via the internet 105. However this electronic device could take a variety of forms (e.g. mobile phone, 'smart phone', portable music player, tablet PC, stereo HiFi, digital radio, television). Another electronic device (in this example a music player) 120 owned by user B is used to download 116 a different music track 114 from server 110. This music track 114 is marked with the account code 115 of user B.

Now user B decides to give 123 user A a copy of track 114 (denoted 114'). For example he may copy track 114 from music player 120 onto USB stick 103 and give it to user A. However, this copy 114' is marked with the account code 115 of user B. Electronic device 100 now has stored within drives 101, 102 or 103, music track 111 marked with the account code 112 of user A and music track 114' marked with the account code 115 of user B.

The processor 137 may be a microprocessor running a computer program or it could be dedicated hardware and has the following components (which may be implemented as software modules): It has receiver 130, code extractor 131, mapper 132, comparator 133, reporter 134 and restrictor 135. The receiver 130 receives the marked tracks. The code extractor 131 extracts the embedded codes from the tracks 111, 114' using knowledge of the digital watermarking scheme, performing the reverse of embedder 107. The mapper 132 maps these embedded codes to account codes 112, 115, performing the reverse of mapper 106. The mapper 132 has knowledge of how the codes map (for example a lookup table or formula) or alternatively it has the ability to get this information over the internet 105. The comparator 133 is used to compare the two account codes 112, 115. If they do not match then there is a possibility that one or other or both tracks have been acquired without authorisation. The reporter 134 generates a report 140 if the account codes do not match. This report may be passed to a restrictor 135, which restricts access to the electronic content if the account codes do not match. For example the restrictor could prevent the device from playing the music tracks or even permanently delete them from the device storage media. Alternatively it may degrade the quality of the tracks or substitute them for a recorded message. It may issue warnings before doing so.

The reporter 134 may upload 141 to the server 110 (or a different server) the report 140, which may include both account codes. Both account holders may have breached the licence terms. One account holder breached the terms of their licence by supplying the music track to another person; the other holder did not have a licence to possess or use the music track. Although from this information alone it may not possible to determine which was which, it does not necessarily matter as both parties have committed a breach. Once this information has been received at the server 110, the accounts can be identified. In order to setup the account, bank or credit card and address information may have been supplied and verified. Payment for the account may then be taken automatically by direct debit or credit card if terms and conditions allowed.

The processor 137 may execute a computer program or application stored and run on the device 100 to implement the modules 130-135. This program could be the same program used to play music tracks or it could be part of the operating system or could even be a program for a completely different purpose. It may be a free 'app' supplied by a third party. The program may be present when the device was bought, or it could be installed from electronic media such as CD or DVD or it could be downloaded from a server via the internet 105. For example the computer program executed by processor 137 could be a music application that takes MP3 encoded tracks, uncompresses them and sends them to the electronic device's 100 loud speakers and/or jack sockets for external amplifiers and speakers. Each time it plays a requested track, the receiver 130 could intercept the track, store it in memory and then call the modules 131-135. Alternatively, rather than wait for tracks to be played, the receiver 130 may periodically scan the available storage devices 101, 102, 103 for different tracks to compare. Once it finds one, it stores it in memory and calls the other modules 131-135.

The mapping may be constant and non-programmable. In the simplest case the mapping is one-to-one, such that the embedded code is the same as the account code. In this case the mapper 106 and mapper 132 are not required. Alternatively, the mapping between the embedded code and its associated account code may be different for different tracks. For example, the mapping may be dependent on characteristics of the track such as spectral content or the identity of the track, making it harder for attackers to decode. The mapping may be programmable, enabling the ownership of a track to be changed without downloading it again.

It may be possible to compare the account codes without extracting data from the tracks. For example, the comparator 133 may compare the tracks by performing a correlation between them (or other mathematical comparison technique). If for example the two tracks have the same pseudo random noise signal imposed, this may be detected, allowing comparative information to be obtained. In this technique, a separate extractor 131 and mapper 132 are not required.

It is possible that a user would have different accounts with different music distributors. However, it is less likely that a single user would have multiple accounts with the same distributor. If they did have good reason to operate different accounts (for example for different family members within the same household) then that distributor could link them, such that they all used the same account code. If the mapping between embedded code and account code is chosen to be programmable, then multiple embedded codes could map to the same account code. Different distributors may have different account numbering systems, and also different ways of implementing the watermarks. Thus if two account codes are extracted from the same distributor which do not match, then the program can make a reasonable assumption that at least one of the tracks is unauthorised. It is also possible that distributors and/or publishers could cooperate and use a universal account code system.

The technique of detecting unauthorised use by non-matching account codes is very robust. If someone tries to attack the coding scheme by modifying the audio signal, the likelihood is that they will just corrupt the code. It is not likely that this corrupted code will match any other codes present. If a one-to-one mapping scheme is used, it is possible to make the comparison using just a portion of the code. If any portion of the embedded code does not match then unauthorised use may be determined. This can be advantageous as it means that an application used to make the comparison does not need to have all the details required to decode the whole code. Thus if the application is reverse engineered, the whole coding scheme does not unravel and it is still possible to use other portions of the code to determine unauthorised use. If third parties are used to develop applications for detecting unauthorised use, it would be prudent to give them only access to portions of the code. It is also possible to use multiple codes.

Figure 2:
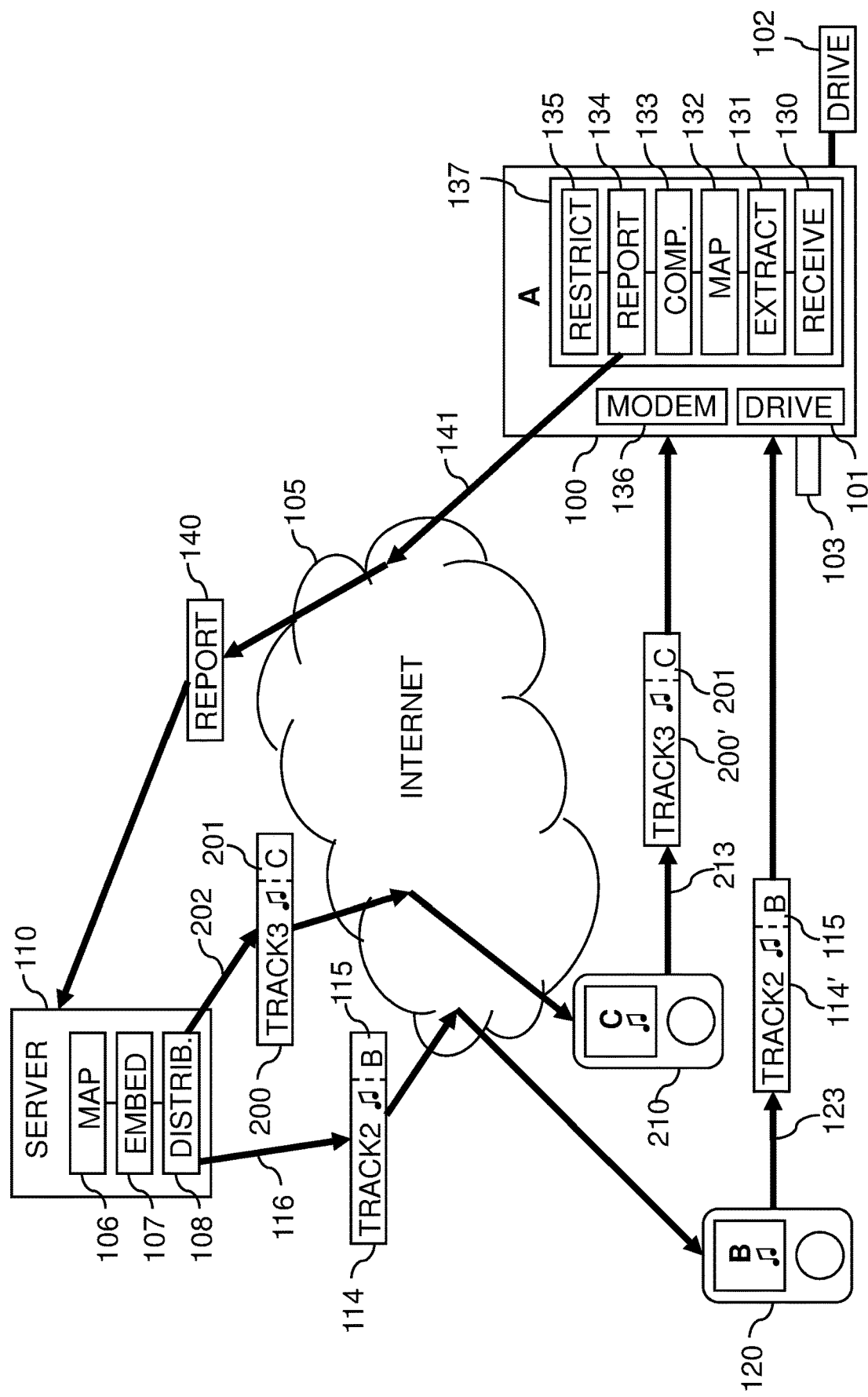
FIG. 2 shows a system for detecting unauthorised content and its operation when content is copied from multiple sources.

FIG. 2 shows another example. Music is distributed from server 110 as before. In this example user A has not purchased any music from the distributer operating the server 110, and may not even have an account with them. User B downloads 116 to portable device 120 music track 114 marked with account code 115 of user B. User B then passes on 123 to user A a copy of music track 114, denoted 114'. The copy 114' retains its embedded code and is hence marked with the account code 115 of user B. This copy is transferred from portable device 120 to a drive (101,102 or 103) attached to device 100. Another user, user C downloads 202 onto portable device 210 music track 200 which is marked with the account code 201 of user C. User C then passes on 213 from device 210 to device 100 a copy of music track 200 (denoted 200'). Track 200' retains its embedded code such that it is still marked with the account code 201 of user C.

The processor 137 within device 100, receives the tracks 114' and 200' using receiver 130 and extracts their embedded codes using the extractor 131. These are mapped to account codes 115, 201 with the mapper 132. The comparator 133 compares the two account codes 115, 201 to see if they are the same. As they are different, the comparator 133 determines that there is a possibility of unauthorised possession or use. In response, the reporter 134 sends 141 report 140 to inform the server 110. Although neither user B nor user C have possession of unauthorised tracks, they are still in breach of the license terms by passing the material on to user A. They could therefore be fined for their actions if the license terms so allowed.

In addition to sending the account code 115, 201 information in the report 140, the report 140 may additionally comprise a snippet of each track. This snippet would typically be a small part of the audio signal (in time domain, frequency domain or some other domain). The server 110 could then lookup each snippet in its database of tracks to identify the title of each track. This information could be used to provide evidence to the users of the unauthorised possession and use. The processor 137 could also determine identifying information (e.g. device serial numbers, MAC address, registered user, IP address) from the electronic device 100 and include this in the report. This information could be passed on to the device's 100 internet service provider in order to issue warnings or fines. For serious breaches the internet service provider could be requested to suspend their service.

Before the server 110 takes any action against either account holder or the owner of device 100, it may make checks on the accounts to see if the use is legitimate. For example, if both accounts were registered at the same address, such use may be legitimate. This would avoid problems when people move in together and combine their music collections. It would also enable offspring to have their own separate accounts and play their music on their parents' stereo equipment. The server could also check to see if any transactions involving a transfer in ownership between either of the tracks registered to the accounts had occurred, which would make the use legitimate. When such account changes occur, the users may be offered to re-download the content with new embedded codes. This could be performed gradually over time whilst synchronising with cloud storage servers.

It is also possible to apply these systems to content supplied on electronic media such as CDs. If the CD is purchased over the internet, it can be recorded before despatch with an individual embedded code such that it is marked with the user's account code, similar to downloaded content. If a CD is purchased in a shop, the shop could have its own CD writer and write each CD with an embedded code at point of purchase. This would require the user to have an account setup with that chain of shop or with the music distributor or publisher for that particular album or track. In order to eliminate the time required to write the CD in-store, each store could have a number of CDs pre-recorded with a reduced number of codes, for example a 3-bit number giving 8 possible combinations. Each user would then have a non-unique account code mapping to one of the combinations of embedded code. The store would stock each combination of code for each CD. By restricting the number of codes, it reduces the amount of inventory each store needs to carry. When a user takes a CD box to the till, he or she provides identification (or uses a credit card or smart phone to pay for goods which simultaneously provides identification). The till then tells the shop assistant which CD to take from the drawer. The CDs could be in colour coded bins. The mapping between colours and the mapping between account code and embedded code could differ from CD to CD.

Figure 3:
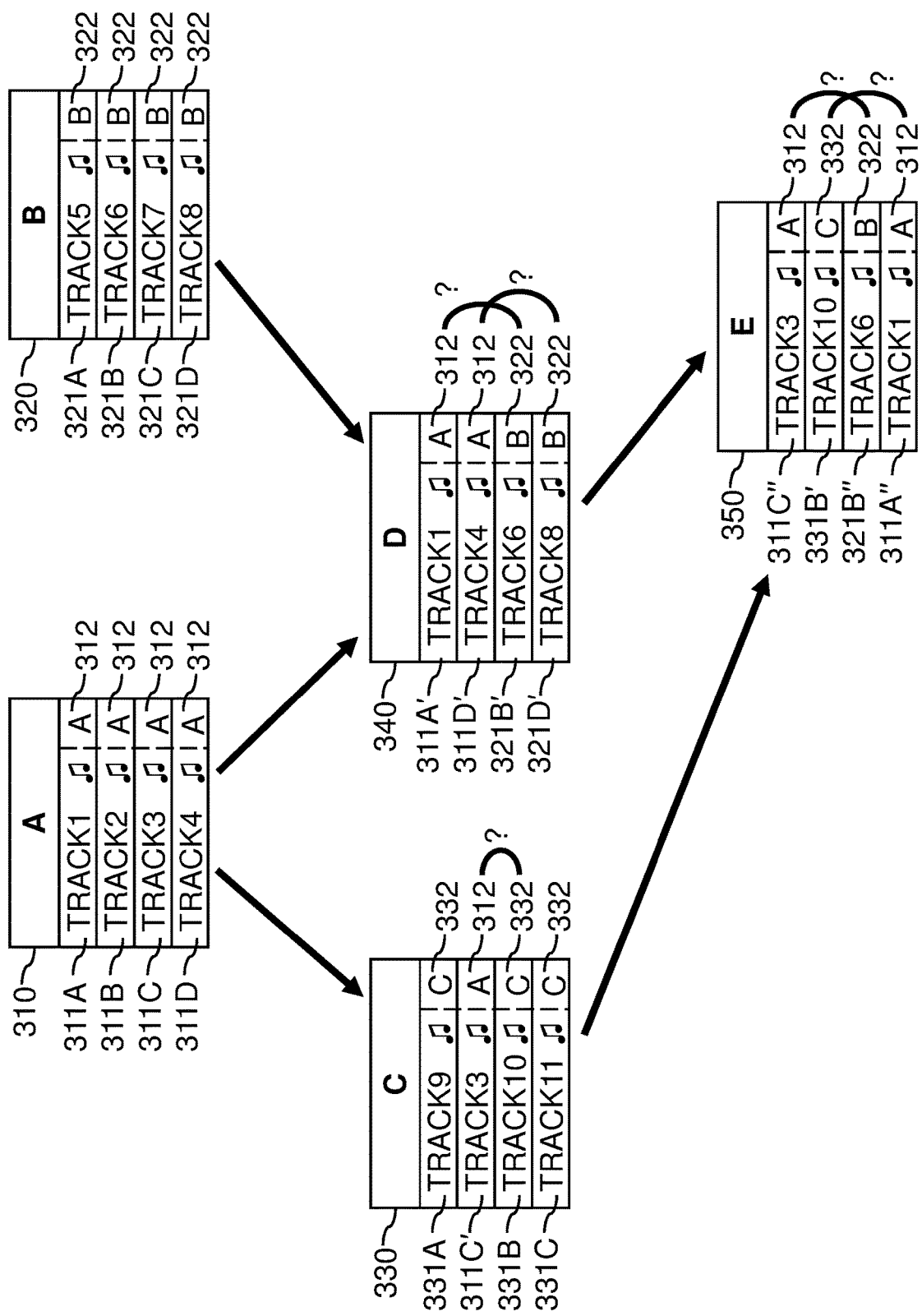
FIG. 3 illustrates how duplicated content propagates through multiple recipients.

FIG. 3 shows how music copied between different users propagates. User A has music collection 310, with music tracks 311A-311D, each having respective embedded codes such that they are marked with the account code 312 of user A. User B has music collection 320 with music tracks 321A-321D each having embedded codes such that they are marked with the account code 322 of user B. As both user A and user B only have tracks marked with a single account code (312, 322 respectively), the processor 137 determines that neither user A nor user B has unauthorised music.

User C has music collection 330. User C has purchased tracks 331A-331C having respective embedded codes such that they are marked with the account code 332 of user C. However, user C also has track 311C' which is a copy of track 311C taken from user A. Track 311C' is also marked with the account code 312 of user A, as the copy retains the marked information. If the account code 332 of track 331B is compared to the account code 312 of track 311C', there is a mismatch determining unauthorised possession. However, equally if the account code 312 of track 311C' is compared with that of either tracks 331A or 331C there will also be a mismatch determining unauthorised possession.

User D has music collection 340. User D has not purchased any music, but only copied music from users A and B. User D is in possession of tracks 311A' and 311 D' which are copies of tracks 311A and 311D respectively taken from user A. The tracks 311A' and 311D' are marked with the account code 312 of user A. User D is also in possession of tracks 321B', 321D' which are copies of tracks 321B, 321D respectively taken from user B and marked with user B's account code 322. If for example the account code 312 of track 311A' is compared with the account code 322 of track 321B' there is a mismatch indicating unauthorised possession. There is also a mismatch if the account codes (312, 322) associated with tracks 311D' and 321D' are compared.

User E has music collection 350 and has copied music from user C and user D. User E has tracks 3110" and 331B' which are copies of tracks 311C' and 331B respectively, taken from user C. Track 3110" is marked with account code 312 of user A. Track 331B' is marked with the account code 332 of user C. User E also has tracks 311A" and 321B" which are copies of tracks 311A' and 321B' respectively, taken from user D. Track 311A" is marked with the account code 312 of user A and track 321B" is marked with the account code 322 of user B. Tracks 311A", 321B" and 3110" are second generation copies, whilst track 331B' is a first generation copy. Comparing the account codes associated with any combination of tracks except 311A" and 3110" will result in a mismatch indicating unauthorised possession. For example if tracks 3110" and 321B" are compared there is a mismatch indicating unauthorised possession. Alternatively if tracks 331B' and 311A" are compared there is a mismatch indicating unauthorised possession.

It isn't necessary for every track downloaded to be marked in the same way and it can be advantageous if for example the watermark is applied differently from one track to another. This means that if the watermarking scheme is decoded for one track, it doesn't defeat the whole scheme. Different tracks could use entirely different watermarking schemes altogether. Alternatively they could use similar watermarking schemes but with different parameters. For example some schemes require a pseudo random sequence and different tracks could use different seed values for the sequence. It is also possible to issue watermarked tracks, but not release the program for detecting them until sometime later. This has the advantage that the tracks have a chance to propagate before news of the watermarking spreads across internet blog sites.

Figure 4:
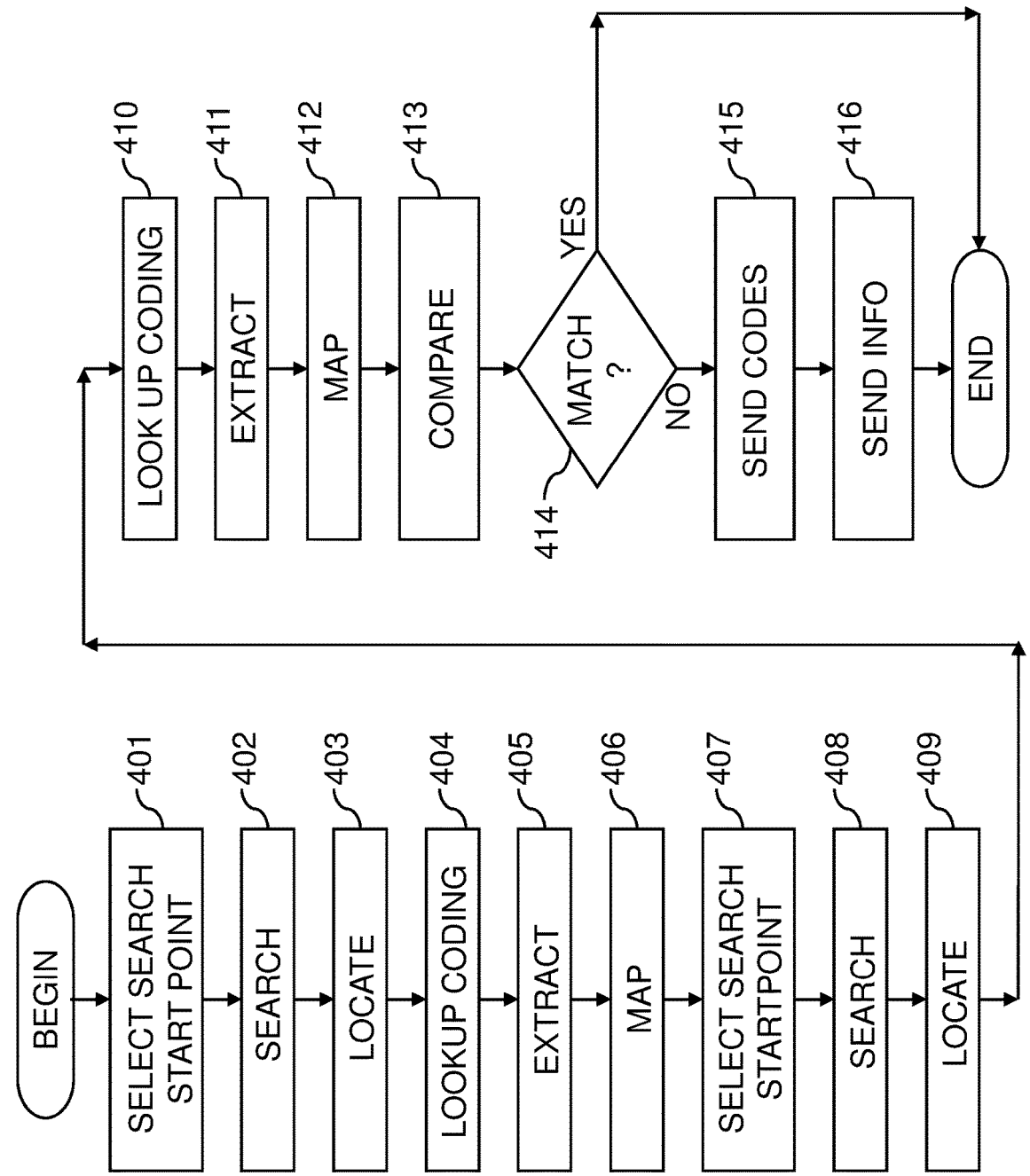
FIG. 4 shows a method of detecting unauthorised content.

FIG. 4 shows a method of detecting unauthorised electronic content. It may be implemented by executing a computer program which is called as an interrupt periodically or during times when the main application is in a wait state or alternatively on a trigger such as a signal appearing at the jack socket. At the beginning of the interrupt, a start point on one of the storage devices is randomly selected, step 401. The program then searches for media files from that point, step 402. The first track is located, step 403. The coding scheme for that track is looked up, step 404. For example the program may have a table of different coding schemes stored within it. The particular coding scheme may be determined by some characteristic of the track which is readily obtained by a simple analysis (e.g. track length, frequency range etc.). The embedded code for the first track is then extracted, step 405. If a one-to-one mapping scheme is employed, then this embedded code is also the account code. Otherwise step 406 is used to map the embedded code to the first account code.

A new random search point on one of the storage devices is determined, step 407. This is followed by a new search for media files, step 408. The second track is located, step 409 and the coding scheme for that track looked up, step 410. The embedded code is then extracted from the second file, step 411. If a one-to-one mapping scheme is employed, then this embedded code is also the account code. Otherwise step 412 is used to map the embedded code to the second account code.

Next the account codes from the first file and the second file are sent to a module which compares them, step 413 and a decision made, step 414. If the account codes match then they are likely from the same account and the interrupt ends. If the codes do not match then the codes are sent to a server over the internet, step 415. Other information such as device serial numbers, IP address etc may also be sent over the internet to the server, step 416. The interrupt then ends, and the program returns to whatever it was doing before the interrupt was invoked. As an alternative, the interrupt can be invoked when a track is played, rather than search available storage devices. In this case steps 401-403 and steps 407-409 may be omitted.

Figure 5:
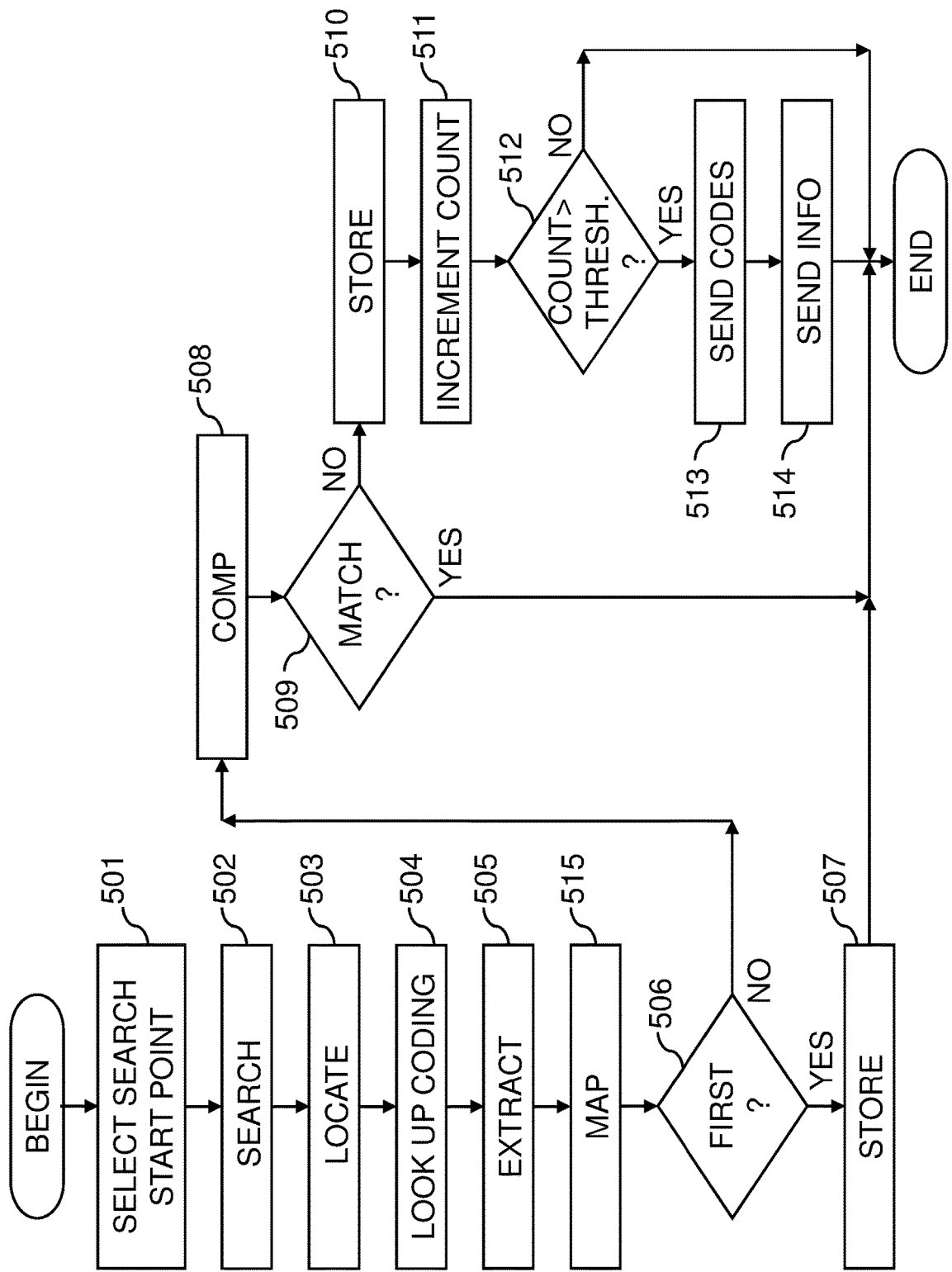
FIG. 5 shows an alternative method of detecting unauthorised content.

FIG. 5 shows an alternative method which allows a certain number of non-matching codes before determining there is unauthorised use or possession. This could be of use for ensuring that a false positive result does not occur if a family of users each play music from different accounts on the same device. It may allow music from an arbitrary number (e.g. 10) different accounts to reside on the same device. If more than this number were found, then it would determine that the likelihood is that the music is unauthorised.

The method may be implemented as interrupt routine. Before the interrupt is first called, a mismatch count variable is initialised to zero. The first step of the routine is to randomly select a search start point, step 501. Then there is a search for tracks, step 502. A track is located, step 503, and the coding scheme for that track is looked up, step 504. Using this scheme the embedded code is extracted, step 505. If a one-to-one mapping scheme is employed, this embedded code is also the account code. Otherwise step 515 is used to map the embedded code to an account code. A test is made to see if it is the first track, step 506. If it is, the account code is stored in memory, step 507 and the interrupt ends. If it is not the first track, the account code is sent to a module which compares it against all the other account codes in the memory, step 508. A test is made to see if a match is found, step 509. If there is a match, the interrupt ends. If there is no match, the account code is added to the memory, step 510, and the mismatch count is incremented, step 511. A test is then made to see if the mismatch count is greater than a threshold, step 512. If it is not, the interrupt ends. If the mismatch is greater than the threshold value then the account codes are sent to a server over the internet, step 513. Other information such as the device serial number or other identifying information may also be sent. step 514. The interrupt then ends. The interrupt is called periodically and continues from the start each time, gradually searching through the files.

As an alternative, the program can just look at music tracks which it has been requested to play. In this configuration steps 501-503 are omitted. The interrupt starts at step 504 and the music being played is passed to it. The interrupt could be triggered by a signal appearing on the audio output and the track intercepted from this point. This has an advantage if the tracks are stored in an encrypted format.

Typically the two tracks would be different (ie the content is different), as it is unlikely that a user would have two copies of the same track. However, if the user did copy the same track from different sources such that they were marked with different codes, then the system would still work. Typically they would not come from the same set (e.g. album or suite) or be otherwise so related, but again the system would still work if the tracks were marked with different authorised users.

It is now becoming more common for music and other electronic content to be distributed as executable applications (programs) for programmable devices. In this case the application may carry the non-executable electronic content as data, such that when the application is invoked it converts this data into signals which may be played. The same application which carries the electronic content may be used to perform the detection of unauthorised electronic content. It may do this by looking for other electronic content marked with codes stored on the same device for example. The application carrying the electronic content is therefore marked with the code it is looking for. Similarly an executable electronic content (such as a video game) could look for codes present in another electronic content, such that the executable electronic content is marked with the code it is looking for. It is possible that both electronic content are carried by programs, or that both are executable electronic content, or that one is executable electronic content and the other is carried by a program. The codes being looked for may be embedded within electronic content data, within an executable electronic content or within an application carrying electronic content.

It is important to note that the account codes being compared have been derived from actual electronic content, even if they are subsequently stored in memory. That is the information is from (or is read from, comes from, derived from) the electronic content. This is in contrast to a different technique whereby codes are compared to a database, the database having knowledge that a particular electronic content has been marked with a code, but not actually reading the code from the electronic content itself.

Figure 6A:
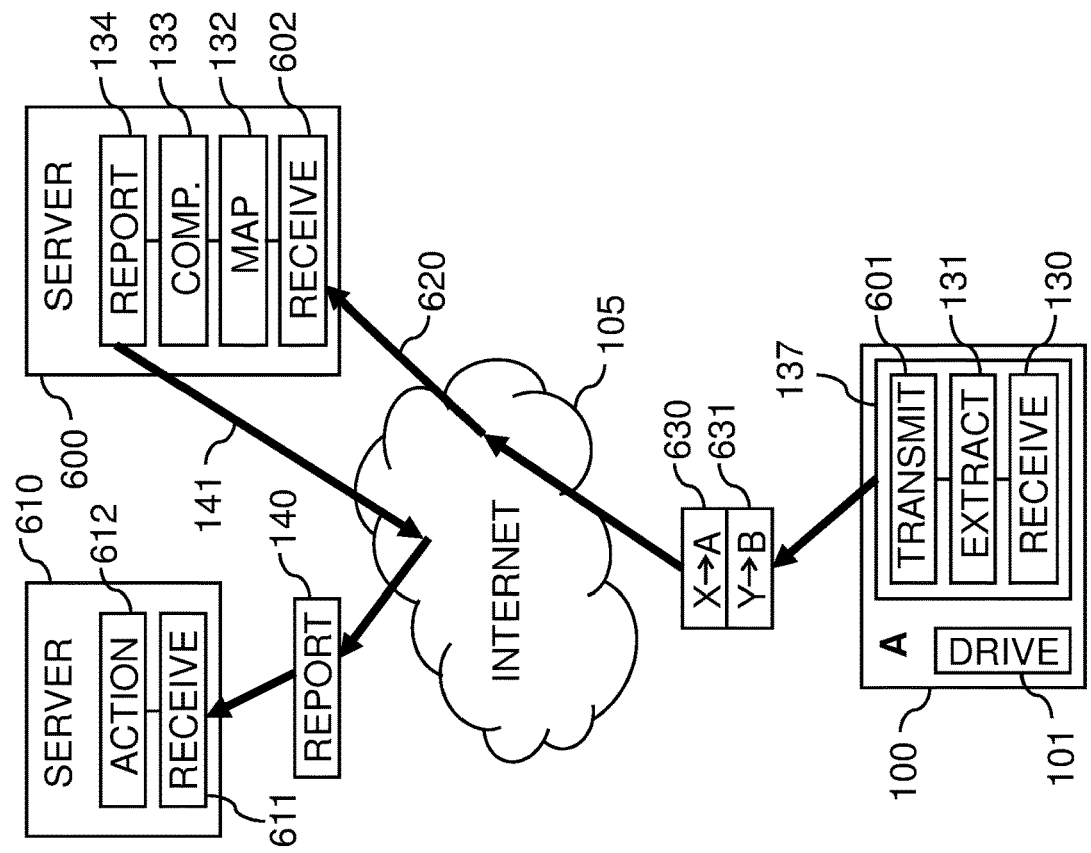
FIG. 6 shows several systems for detecting unauthorised content.

FIG. 6 shows two more systems. In FIG. 6A, the extractor 131, mapper 132, comparator 133 and reporter 134 are all located within a remote server 600. Electronic device 100 has receiver module 130 which receives two music tracks 111, 114' by intercepting them from storage or the jack socket. Electronic device also has transmitter module 601 which sends 620 the two music tracks 111, 114' over the internet 105 to remote sever 600. The remote server 600 receives the tracks with receiver 602. The music tracks 111, 114' have embedded codes which map to the account codes 112, 115 of user A and user B respectively. The extractor 131 first identifies the tracks by comparing them against its track database. Using this knowledge it looks up the watermarking scheme for each track. It then uses those particular watermarking schemes to extract the embedded codes for each track. For each embedded code, the mapper 132 maps them to account codes 112, 115. The mapper 132 may use a lookup table in conjunction with the known track identity. The comparator 133 compares the two account codes and if they are different determines there is a possibility that at least one of the tracks is unauthorised. The reporter 134 sends 141 a report 140 to another server 610 for further action. Server 610 receives the report 140 using receiver 611 and takes action with actioner 612. The action may take a variety of forms, for example: debiting the account holders bank or credit card account, informing other parties such as the copyright owners, publishers, distributors, copyright protection agencies or government agencies, or collecting data for monitoring. The report may contain the two account codes 112, 115 and may also include information identifying the tracks (e.g. title, artist, song code) and/or the devices from where they came. This system allows a much wider range of watermarking schemes to be used as the server can be continually updated. It also means that the embedded program does not need to be updated and further, as the decoding scheme is not within the program it cannot be readily reverse engineered. Depending on how the watermarking is applied, it may be possible to extract the embedded code without access to the whole track, in which case just a snippet or portion of each track is sent to the server 600.

Figure 6B:
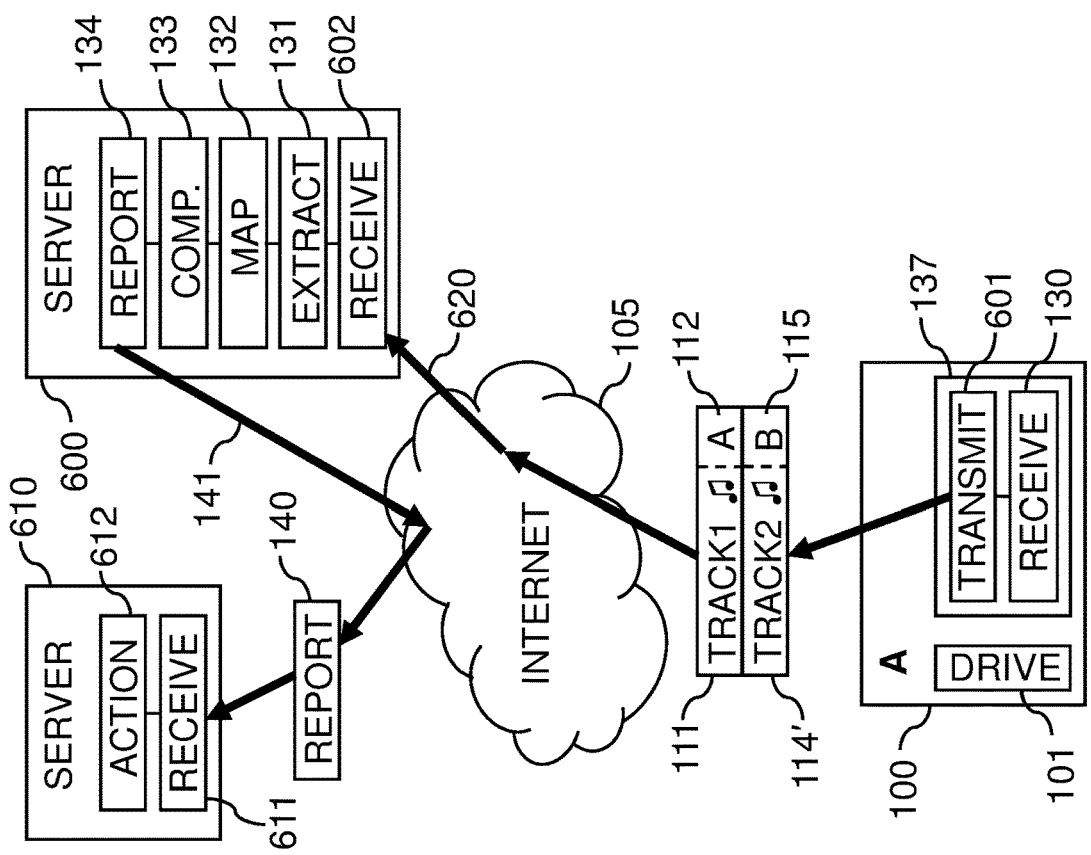

In FIG. 6B, the extractor 131 is located in the portable device 100. The mapper 132, comparator 133 and reporter 134 are all located in the remote server 600. In operation, the receiver 130 receives tracks 111 and 114'. The extractor 131 extracts the embedded codes 630, 631 within tracks 111 and 114' respectively. The transmitter 601 then sends 620 the embedded codes 630, 631 to the server 600. The server 600 receives the embedded codes 630, 631 with receiver 602. These are mapped to account codes 112, 115 respectively using the mapper 132. The account codes 112, 115 are compared with the comparator 133. The comparator 133 determines the account codes 112, 115 do not match, so the reporter 134 sends 141 a report 140 to another server 610. Server 610 receives the report 140 with receiver 611 and takes action with actioner 612.

The various component functions involved in detecting unauthorised used may be distributed arbitrarily between the device 100 and the server 600. There are many permutations for how they may be apportioned. For example, both the extractor and the mapper may be located within the device 100. In this case the account codes 112, 115 are sent to the server 600. These are then compared with comparator 133 within the server 600. As another example, instead of sending the whole track to the server, the transmitter 601 may send a snippet (portion) of a track. The server then looks up the coding scheme for that particular track and sends back a key back to the extractor 131. The extractor 131 can then use that key to extract the embedded codes. Many devices may share the same server 600. Although the server 600 is represented as a single unit, it may comprise a number of interconnected devices. For example the server could be a chain of remotely connected devices which are arbitrarily located in different countries around the world, with different functions carried out within each device. The server may be a hardware server or it may be a software computer program. The server need not be remote and could be located within the user device. It could be a software module within the same processor used to play music in an end-user device.

A benefit of performing the mapping within the server is that it allows the mapping between the embedded codes and the account codes to be fully programmable, thus facilitating easy transfer of ownership. Each track distributed to each user may have a different embedded code, which may be unique for that track. Different tracks distributed to the same user may also have different embedded codes. A lookup table is maintained on a server which for each track distributed maps its embedded code to an account code. The lookup table could in fact map the embedded code to multiple account codes to facilitate different family members living at the same address having separate accounts. If a user wishes to sell or transfer his or her content to someone else, then that person can make a request to the distributor server over the internet. The distributor server then amends the lookup table such that the embedded code for that track references the account code of the user the content is being transferred to. An advantage of this technique is that it prevents a user continuing to access the track after it has been transferred. It is also possible to loan content by temporarily transferring ownership.

It is possible to separate the coding/extraction from the distribution. The embedding, extraction and comparison of codes may be carried out in the publisher's server and the distribution and account management may be carried out in the distributor's server. When a user requests a track from the distributor, the distributor's server requests a watermarked track from the publisher's server corresponding to the user's account code. The publisher's server generates the track with an embedded code and maintains a look up table to map it to the account code. The system is secure, because only the distributor's sever knows the linkage between an account code and the user and only the publisher's server knows the algorithms for extracting the embedded codes and mapping them to the account codes. A benefit is that the publisher can compare tracks that have been downloaded from different distributors. As an alternative the mapping between the embedded code and account code could be carried out in the distributor's server. In this case, the algorithm would still reside wholly within the publisher's sever but the comparison would take place within the distributor's sever. The publisher could actually pre-code a large number of tracks and send them to the distributor so that the distributor does not have to request each track individually.

Figure 7:
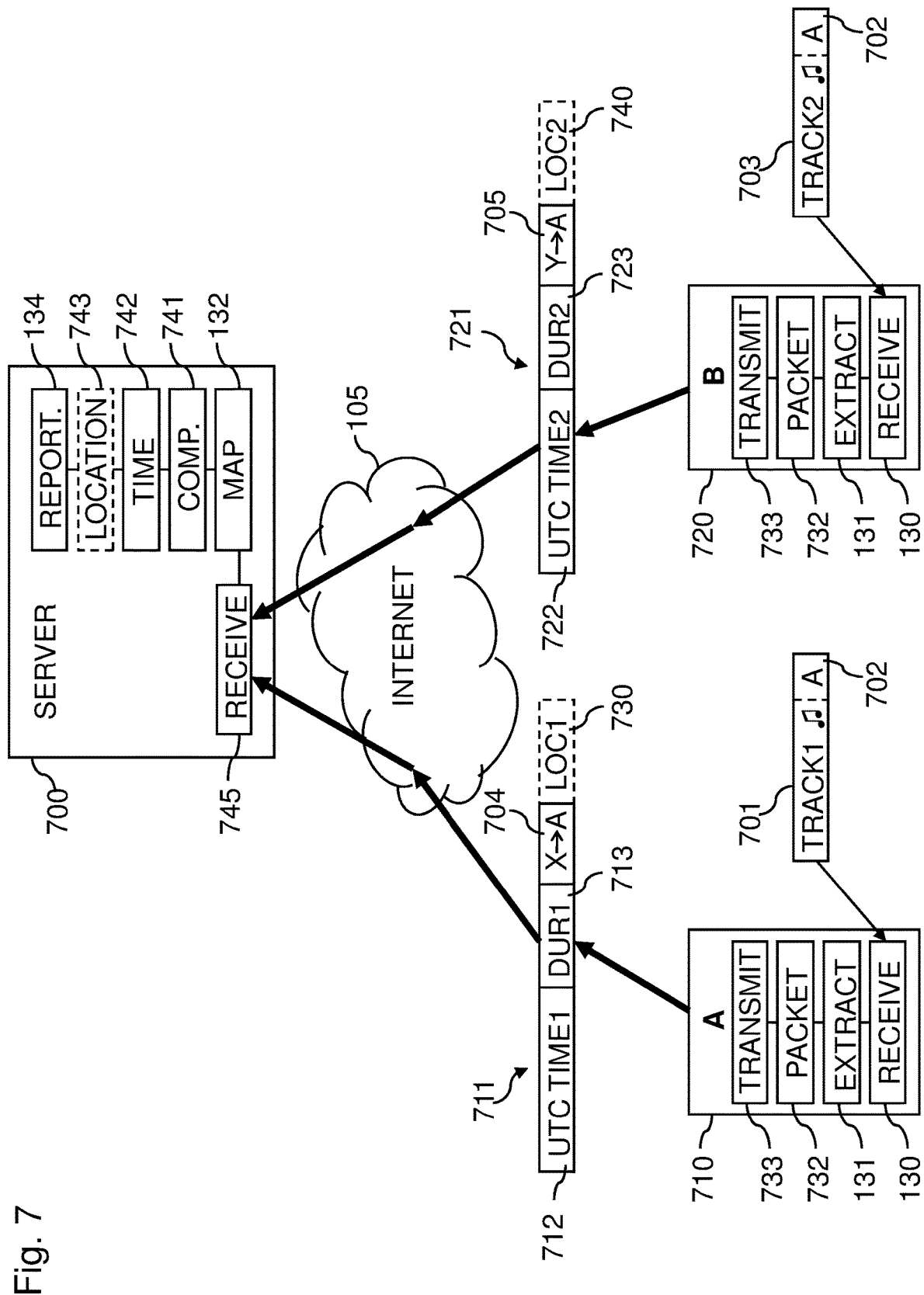
FIG. 7 shows a further system for detecting unauthorised content.

A system with a different type of comparator is shown in FIG. 7, which can combat multiple users from sharing the same account. If music tracks from the same account are simultaneously being accessed on different devices then there is a possibility that at least one of these tracks is unauthorised. In the example, user A has electronic device 710 comprising receiver 130, code extractor 131, packet generator 732 and transmitter 733. Similarly, user B has electronic device 720, which also has receiver 130, code extractor 131, packet generator 732 and transmitter 733.

In the example, electronic device 710 plays music track 701 which is marked with the account code 702 of user A by having within it embedded code 704. The receiver 130 receives the track 701. The code extractor 131 extracts embedded code 704 from track 701. The packet generator 732 records the date, time and duration the track 701 is played for and generates data packet 711. The data packet 711 comprises: The time/date at which the track started playing 712, the duration it is played for 713 and the embedded code 704. The time/date 712 could be a timestamp in the Coordinated Universal Time (UTC) format. The duration 713 may be less than the duration of track 701 as it may be interrupted prematurely. The transmitter 733 sends data packet 711 to server 700. Similarly electronic device 720 plays music track 703 marked with the account code 702 of user A. Electronic device 720 sends data packet 721 to server 700. Data packet 721 has time 722 track 703 is played, its duration played for 723 and its embedded code 705.

The server 700 comprises a receiver 745 to receive data packets 711, 721, mapper 132, comparator 741, time analyser 742, optional location analyser 743 and reporter 134. The mapper 132 maps the embedded codes 704, 705 to account codes 702, 702 respectively.

The comparator 741 compares the account codes 702, 702. If the account codes did not match then it would take no further action. However, as the account codes 702, 702 do match, then the time analyser analyses the times 712, 722 and durations 713, 723 to see if the tracks were playing at the same time. This may be deduced if the following condition is true: ((722>712) AND (722<(712+713))) OR ((712>722) AND (712<(722+723))). If the codes match and the tracks were playing at the same time, the server deduces that unauthorised music may have been played. The reporter 134 may then send a report to alert this has taken place. Note that unauthorised use can be determined if tracks associated with the same account codes are played simultaneously, even if the tracks (content) themselves are different. Furthermore, rather than two different music tracks, two different electronic content types could be played simultaneously (for example a video and a music track). However, equally the system also works if two copies (instances) of the same track are played simultaneously. Typically server 700 receives a large number of reports from different devices all the time. The server would be continually sifting through the reports looking for pairs of matching account codes and then looking for overlap in the times these tracks are playing.

Optionally and if available, location information is also sent in addition to the time and track duration information. Different users may play tracks on their electronic devices from the same account at different times. However, if the time separation between when the tracks are played is greater than the travel time between the locations of the devices, then multiple people may be playing music from the same account. In this case the packet generator 732 additionally records the location coordinates of the device via a GPS receiver (not shown). The reports 711 and 721 additionally include the GPS location coordinates 730 and 740 respectively, at the time each track was played. Within server 700 the comparator 741 determines if the account codes 702, 702 match. If they do, the time analyser determines the time separation between when the tracks were playing. If this is negative (ie they overlap) then unauthorised use is determined as before. Otherwise, the location analyser 743 uses the location coordinates 730, 740 together with mapping software and knowledge of travel routes (e.g. plane, sea road and rail) to determine an estimate of the time required to travel between the two locations. If the travel time estimate is greater than the time separation by a given margin, then it is deduced that one or other or both tracks are unauthorised.

Figure 8:
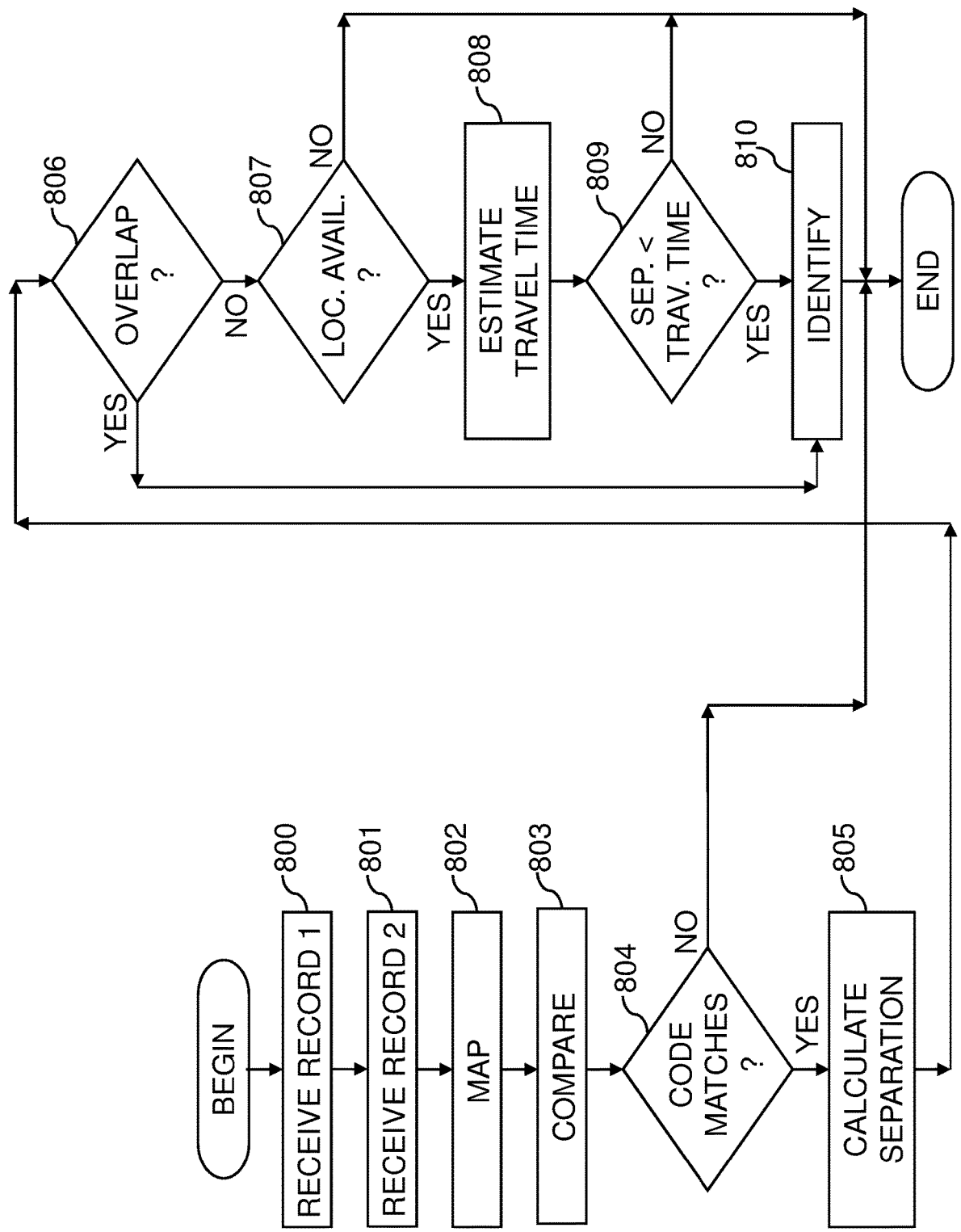
FIG. 8 shows another method for detecting unauthorised content.

FIG. 8 shows the steps carried out within the sever 700. A first record 711 is received from portable device 710 via the internet 105, step 800. A second record 721 is received from portable device 720, step 801. The embedded codes 704, 705 within records 711, 721 are mapped to account codes, step 802. A comparison is then obtained between the two account codes 702, 702 in step 803. A test is made to see if they match, step 804. If they do not match the process ends as there is no evidence the same account is being accessed by different devices. If the account codes do match, the process moves to step 805. In this step using the times the two tracks were accessed 712, 722 and the durations 713, 723 they were accessed for, the amount of time overlap or time separation is calculated. A test is made for time overlap, step 806. If there is time overlap, then the same account may have been accessed by different devices at the same time, so both accounts are identified as potentially using unauthorised music (step 810) and the process ends. If there is no time overlap, a test is made to see if location information is present within each record, step 807. If there is none, then the process ends. If location information is available for both records, then the process moves to step 808 where the travel time between the two locations is estimated. A test is then made to see if the time separation between the tracks being accessed is less than the estimated travel time between the locations by some margin, step 809. If it is, then both accounts are identified as using unauthorised music, step 810, before ending. Otherwise the process ends.

If a one-to-one scheme is used then the mapper is not needed and the embedded codes can be compared directly, without first mapping to account codes. As an alternative it is possible to have the mapper 132 within the portable devices 710, 720. In this case data packets 711, 721 contain the account codes 702, 702 respectively instead of embedded codes 704, 705. As another alternative, the extractor 131 may be located within the server 700, rather than the devices 710, 720. In this case, the data packets 711, 721 instead comprise tracks or snippets of tracks. An additional step of extracting the embedded codes is carried out within the server. The examples illustrated in FIGS. 7 and 8 can be extended so that more than two tracks are used to simultaneously meet the comparison conditions. For example it could be set so that at least four tracks with the same embedded account code need to be playing simultaneously before unauthorised use is deduced.

Figure 9:
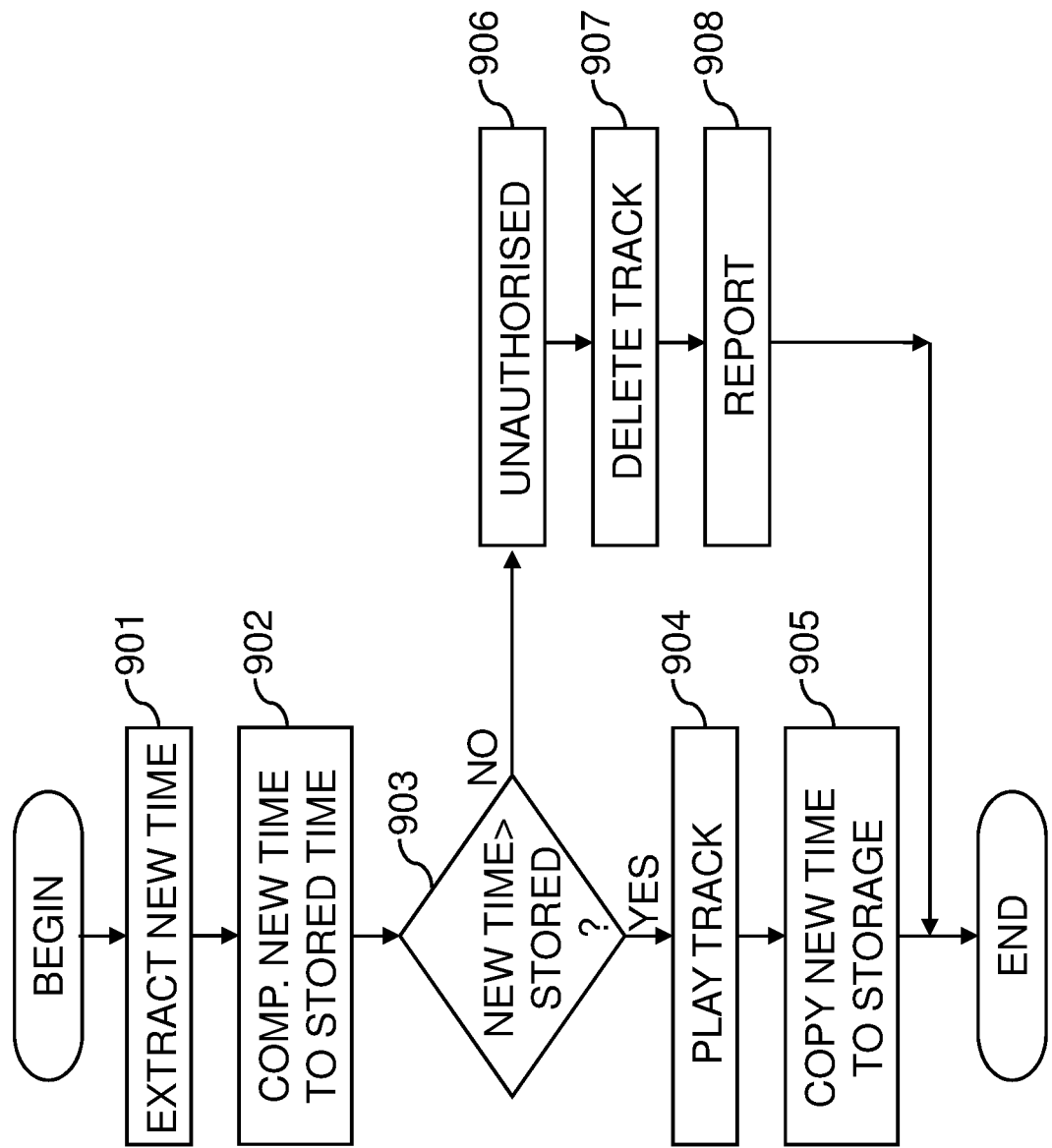
FIG. 9 shows a further method for detecting unauthorised content.

FIG. 9 shows another example method which may be appropriate for streaming music from the internet. This is allows business models whereby users pay each time they play a track. Other variants on this model are also possible, for example whereby users are given a number of plays per month for a monthly subscription. The attraction for the users is that potentially they can have access to a large body of electronic content without having to buy permanent lifetime licences for each electronic content downloaded. It can also be used for broadcast of electronic content over television, radio or internet. The method would typically be run within a portable electronic content player either hard-coded in hardware or as a software application.

Each time a new track is downloaded a timestamp (corresponding to the time of download) is encoded and embedded within the track. Before the routine is called for the very first time, the stored timestamp in memory is initialised to the current time (or zero or an earlier time). The routine is called every time a new track is accessed. First the embedded code is extracted and converted to a new time, step 901. This new time is then compared to the stored time, step 902. If the new time is later than the stored time, step 903, then the track is played, step 904. As the time stamp of the music selected is later than that of the last track played, then the routine determines that it is legitimate. The new time is then copied to the stored time, replacing it, step 905, and the process ends. If however the new time is earlier than the stored time (or earlier by some margin) then the routine determines that the track is unauthorised, step 906. It may upon this determination delete it from memory, step 907. It may also send a report over the internet to a server to take appropriate action, step 908. The routine then ends. As time is a universal metric, it allows different distributors to participate in the scheme without having to communicate with one another what has been downloaded. Each time a new track is downloaded, it effectively updates the current time known to the music player. Thus the scheme is not defeated simply by changing the device's time and date. This method may be used in combination with that of FIG. 4 or FIG. 5.

Alternatively, rather than using timestamps an ordered sequence may be used. In this method, each downloaded electronic content is marked with a code from a sequence, which could be a pseudo random sequence. This sequence is known by the music player. The method follows the same flow as in FIG. 6, except that instead of time codes, there are sequence codes. When a new track is requested, the new sequence code is extracted, step 901. This new sequence code is compared with a stored sequence code, step 902. If the new sequence code comes after the stored sequence code in the sequence (step 903) then the track is played, step 904. The stored sequence code is then replaced with the new sequence code (step 905) and the routine ends. If the new sequence code comes before the stored sequence code in the sequence then the player determines that the track is unauthorised, step 906. It may then delete the track from memory, step 907. It may also send a report over the internet, step 908.

Figure 10:
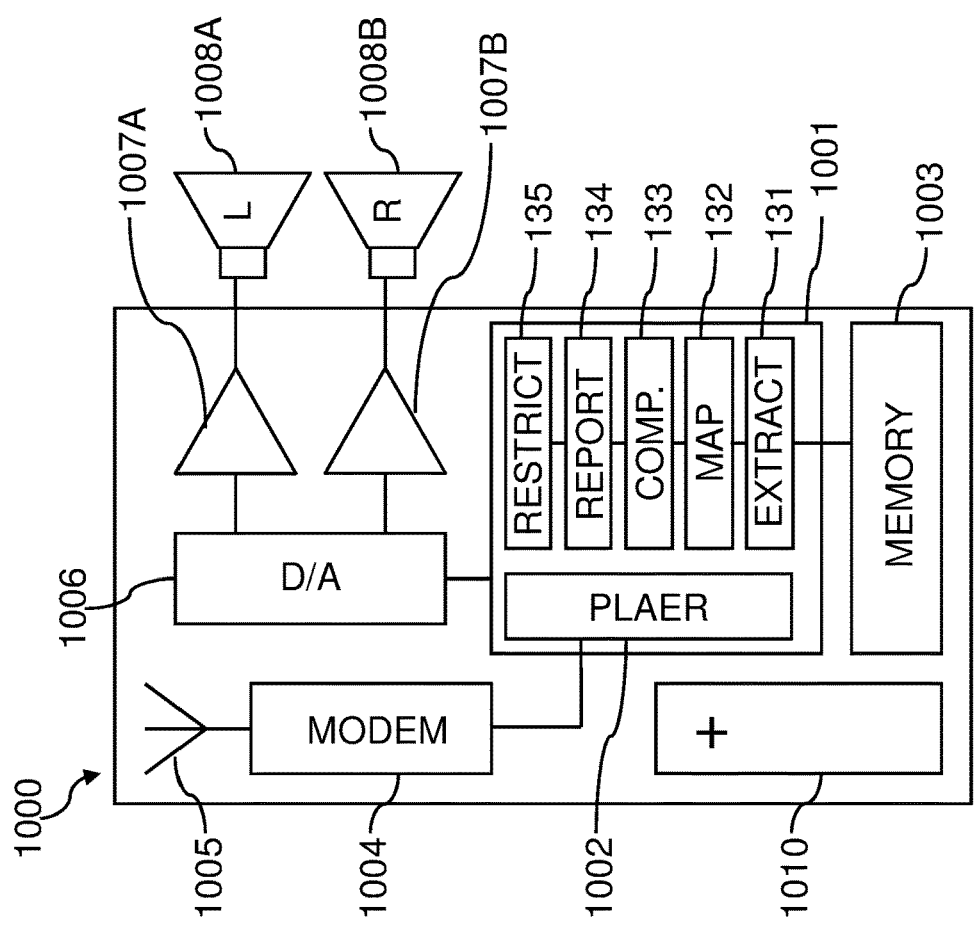
FIG. 10 shows an electronic content player configured to detect unauthorised content.

FIG. 10 shows an electronic device 1000 configured to detect unauthorised possession or use of electronic content. The portable electronic device 1000 comprises: a power source 1010 which could be a primary or secondary cell (for example Li-ion or Li-Polymer); a memory 1003 for storing electronic content (for example NAND flash memory); a processor 1001 for allowing a user to select electronic content stored on the memory and playing it; a digital-to-analogue converter 1006 for taking the digital data stored in the memory and converting to 'Left' and 'Right' analogue output channels; audio amplifiers 1007A, 1007B for amplifying the 'Left' and 'Right' analogue output channels; a 'Left' loudspeaker 1008A and a 'Right' loudspeaker 1008B. There is a modem 1004 and antenna 1005 for receiving electronic via the internet, Wi-Fi and/or mobile phone networks.

The processor 1001 could for example be a microprocessor, an application specific integrated circuit (ASIC) or field programmable gate array (FPGA). The processor 1001 comprises electronic content player 1002, extractor 131, mapper 132, comparator 133, reporter 134 and restrictor 135. The extractor 131 extracts the embedded code from each track as it is played. The mapper 132 maps the embedded code into an account code. The comparator 133 compares this account code with other codes which have been retrieved beforehand and stored in memory. If two (or more) codes are found which do not match, the processor 1001 may determine that the electronic content is unauthorised. If this is the case the reporter 134 will make available this result. It may make the result available to a restrictor 135 which prevents the electronic content from being played (and may even delete the electronic content form memory). If repeated comparisons yield non-matching codes, the restrictor 135 may render the electronic device inoperable. The reporter 134 may send a report 140 over the internet 105 to a server via modem 1004 and antenna 1005. The electronic device 1000 may implement the method of FIG. 9. In this case the comparator 133 compares timestamps or sequence numbers.

Figure 11:
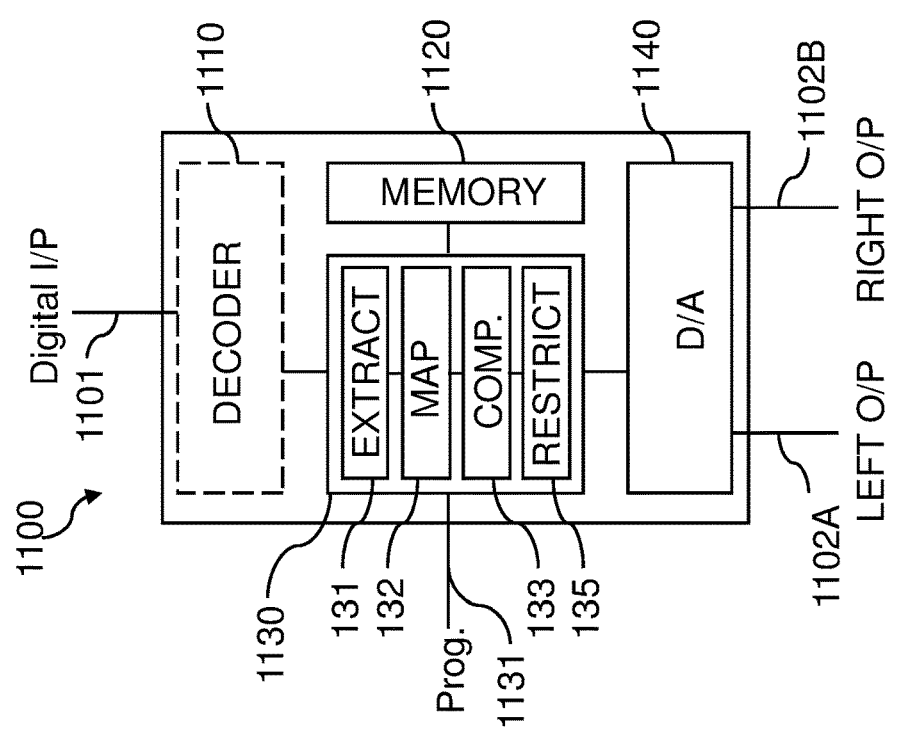
FIG. 11 shows a component for an electronic content player, configured to detect unauthorised content.

FIG. 11 shows an integrated circuit 1100 which performs the function of a digital-to-analogue to converter. This could be an ASIC or FPGA or it could be a multi-chip module. Integrated into the functionality is the ability to extract embedded codes, compare them and take appropriate action. The principle is that media player manufacturers would integrate the integrated circuit 1100 into their hardware. By having the functionality embedded within a critical integrated circuit it makes it very difficult for someone to reprogram or remove the functionality.

The integrated circuit 1100 has a digital input 1101 which receives digital content. The digital input 1101 is coupled to a code processor 1130, which could be a 'processor core' within the ASIC or FPGA, or it could be dedicated logic gates. The code processor 1130 comprises a code extractor 131, mapper 132, comparator 133, and restrictor 135. The code processor 1130 has access to non-volatile memory 1120. The code processor 1130 is coupled to a digital to analogue converter 1140. The digital to analogue converter 1140 converts the digital signal to two analogue signals for the left and right outputs. These are coupled to left 1102A and right 1102B output ports respectively. Optionally there may be a decoder 1110 coupled between the digital input 1101 and the code processor 1130. This may perform conversion from a compressed digital file format into an uncompressed one. It may perform other functions, such as decryption.

The code processor 1130 intercepts the digital data as it passes through. The code extractor 131 extracts any embedded code present. The mapper 132 converts the embedded code to an account code. The comparator 133 compares the account code to codes stored in the non-volatile memory 1120. If the account code is not different from any of the codes stored from the same distributor, then the track is deemed legitimate and it passes through to the digital to analogue converter 1140. If there is a code from the same distributor which does not match, then the restrictor 135 prevents it from passing through to the digital to analogue converter 1140. Thus illegitimate tracks are blocked by the integrated circuit 1100. The integrated circuit 1100 may implement the method of FIG. 9. In this case the comparator 133 compares timestamps or sequence numbers. The code processor 1130 may have a program input port 1131 for inputting information about different watermarking methods. The integrated circuit 1100 may be used as a replacement for digital to analogue converter 1006 within the device 1000. This device would replace the functions 131-135 contained within processor 1002.

FIG. 11 therefore illustrates the anti-piracy system embedded into the DAC of an enabled device. The track may be divided into blocks of a certain time duration (e.g. 30 seconds), wherein each block is watermarked with the user's account code. The user may download the track via the internet, and the track may be compressed using lossless or lossy encoding.

When the user plays the track, it is decompressed by the main processor and sent to the DAC as a stream of digital samples in real-time. The code processor 1130 of the DAC reads the watermark associated with each block as the data passes through and compares it to all other account codes stored in memory 1120. If the account code from the block matches one stored in memory 1120, the track may continue to play. If the account code does not match one stored in memory 1120, then a restriction may be applied.

In this embodiment, the code processor 1130 is configured to store a cumulative number of mismatches in memory 1120. The cumulative number of mismatches is increased each time the account code of a block does not match one stored in memory 1120. Once the cumulative number of mismatches is greater than a threshold, the restriction may be applied. In this embodiment, the restriction applied is by prevention of playback of the track when the cumulative number of mismatches is greater than the threshold (other restrictions include gradual degradation of the quality of playback). The threshold may be track dependent and encoded into the watermark.

If the account code of the block does not match one stored in memory 1120, but the cumulative number is less than the threshold, then the cumulative number of mismatches is increased and the new account code is stored in memory 1120.

The skilled person will understand that providing the track with the same watermark in multiple blocks may improve the signal to noise ratio so that watermarks may be more reliably extracted. Furthermore, the main processor of the device may still extract the watermark and determine if the content is authorized (rather than or in addition to the code processor of the DAC), which will allow the content to be blocked before a portion is played.

The skilled person will also understand that the digital input 1101 of the DAC may receive any form of digital content, such as stored music files or streamed content. For example, the content may include a track divided into blocks of a certain time duration (e.g. 30 seconds), wherein each block is watermarked with a timestamp. The track is streamed in a compressed form. The device receives the track, decompresses it and sends it to the digital input 1101 of the DAC as a stream of digital signals.

In a similar manner to the method discussed above (in relation to FIG. 9), the DAC reads the timestamp on each block as the track is played, and compares it to a previous timestamp stored in memory 1120. The DAC may then react to the results of this comparison in a number of ways. For example, if the timestamp is later than the previous timestamp, the track is allowed to play; or if the timestamp is earlier than the previous timestamp, the track is prevented from playing (as this indicates that the track was illegitimately recorded from streamed content).

In another example, a first timestamp embedded in a first track is used to update and store a current time for the device. On receipt of a second track, the device extracts the second timestamp and compares it to the current time for the device (corresponding to the first timestamp). If the difference between the second timestamp and the current time for device is within a predetermined maximum time period (e.g. the second timestamp is not more than one day earlier than the current time for the device) the device determines that performance of the content is authorized. However, if the difference between the second timestamp and the current time for the device is outside the predetermined time period, the track is prevented from playing (thus imposing a time-limited licence on the content). Typically the track is authorised if the second timestamp is either later than the current time for the device or earlier by up to a maximum predetermined time-limit. i.e. the following condition is met: [second timestamp]−[current time for the device]>−[time-limit]. Furthermore, if the second timestamp is later than the current time for the device, the current time for the device is updated and stored for comparison with timestamps of future tracks. This predetermined time period could be embedded within a watermark of the track and vary from track to track.

In a further modification, the determined current time for the device can be used in conjunction with actual time measuring techniques. For example the current time for the device (which has been read from the first timestamp) may be increased over time while the DAC is powered up. E.g. periodically a trigger causes the current time for the device to be increased by an amount equal to the time between triggers. The DAC may also have a clock input port connected to an external battery powered clock (within the content player). Periodically the DAC stores the external clock value in non-volatile memory. When the DAC is powered on from the off state it reads the external clock value and if it is greater than the stored external clock value, the current time for the device is increased by the difference. When a second track is received, its second timestamp is extracted and compared to the current time for the device (which has been increased over time). Similar to above, if the difference is within a predetermined amount the second track is authorised.

The timestamp can be implemented in a variety of forms to reduce the number of bits. For example, it could be the number of block durations since the scheme was introduced.

Streamed content can be protected in an alternative way to using timestamps. In this alternative system each streamed track is given a unique (or statistically unique) identifier. Each time a track is played, its identifier is read from the watermark. It compares this identifier with a non-volatile memory store to see if the track has been played before. If the identifier is not there, it determines that the track is authorised to be played. It adds the identifier to the memory store and continues playing. If however the identifier is already in the memory store then it determines that the track has already been played once and it is therefore restricted. Hash codes and compression can be used to reduce the memory storage required for the number of streamed tracks over the device's life.

Figure 12:
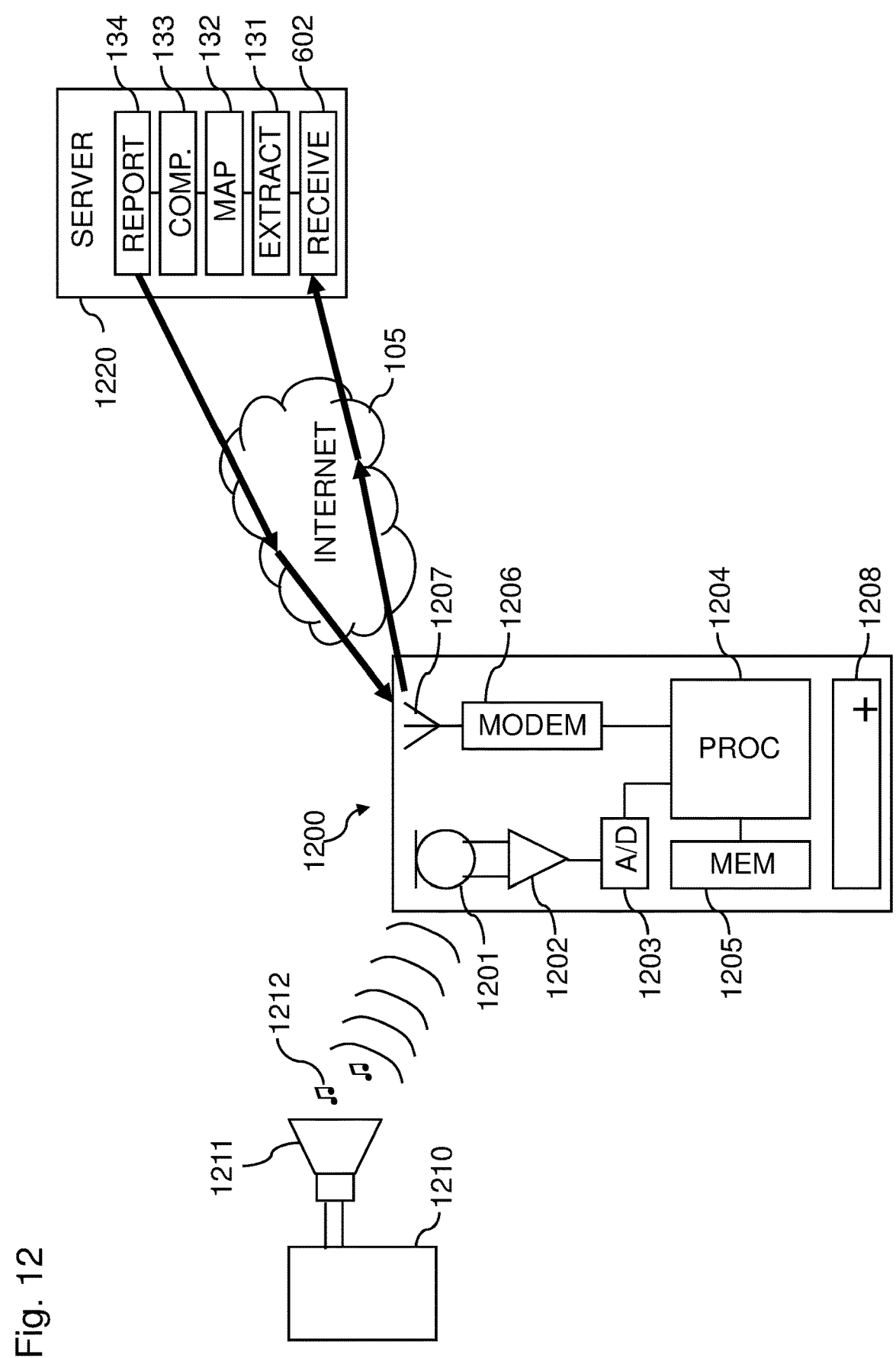
FIG. 12 shows a system for detecting unauthorised content being played.

FIG. 12 shows an embodiment whereby the embedded codes are detected from audible music content when it is played. A music player 1210 plays music tracks through a loudspeaker 1211, emanating sound 1212. The loudspeaker may be one of a pair or more for stereo playback or an earbud or other transducer. A portable detection device 1200 is used to receive the sound 1212 for analysis. It has a microphone 1201 to convert the sound 1212 into an electrical signal. The microphone 1201 could be a moving coil microphone, or any other type of microphone. For example a laser microphone could be used to detect the sound within a building or vehicle by detecting the vibration on a glass window from the outside. The electrical signal is amplified by an amplifier 1202 and coupled to an analogue to digital converter 1203 to convert it to a digital signal. This signal is passed to processor 1204 and stored in memory 1205. The microprocessor 1204 first samples the sound 1212 from one music track. The sound from this music track is transmitted using a cellular modem 1206 and antenna 1207 via the internet 105 to a remote server 1220. The processor 1204 then samples subsequent music tracks from the sound 1212 emanating from the same music player 1210 and transmits them to the remote server 1220.

The remote server 1220 comprises receiver 602, code extractor 131, mapper 132, comparator 133 and reporter 134. The receiver 602 receives tracks from device 1200 and the code extractor 131 extracts the embedded code from each track. The mapper 132 maps the embedded codes to account codes. The comparator 133 compares the account codes. If two account codes from tracks being played by the same music player 1210 are found to be different, then the reporter 134 sends a signal back to the portable detection device 1200, allowing an enforcement officer to take action. The remote server 1220 also stores a record of the tracks and account codes.

Alternatively, the portable detection device could contain all the functionality to detect unauthorised music, without requiring a cellular or internet connection. In this case, the extractor 131, mapper 132, comparator 133 and reporter 134 are contained within the processor 1204. The modem 1206 and antenna 1207 may not be required. It is also possible to split the functionality between the portable detection device 1200 and the remote server 1220 and many permutations are possible. The algorithm in FIG. 4 may be used to determine if unauthorised tracks are being transmitted. It is also possible to have multiple portable detection devices, each transmitting tracks to server 1220. In this case it is possible to implement the system of FIG. 7, whereby the server looks for tracks with the same account code being played at the same time.

The device 1200 in FIG. 12 could also be configured with a different transducer. For example, the microphone 1201 can be substituted for a camera or video recording equipment to intercept images. As another example, the microphone 1201 and analogue to digital converter 1203 could be replaced with an antenna and modem respectively, such that the portable device 1200 intercepts electronic content transmitted wirelessly. In this configuration, the device 1200 may be able to intercept electronic content transmitted over wireless networks, or electronic content transmitted wirelessly between two devices, irrespective of the type of electronic content. The processor would intercept data packets and then reorder and decode them as necessary to reconstitute the electronic content. The processor may also perform decryption.

FIG. 13 shows embodiments in which embedded codes are intercepted during download from the internet. Internet services are provided by an internet service provider (ISP) 1300 to a number of users. Within the ISP 1300 there is: a code extractor 1301, a mapper 132, a comparator 1302. There is also reporter 134 and/or restrictor 135. As electronic content is downloaded via the ISP 1300, it is intercepted.

Figure 13B:
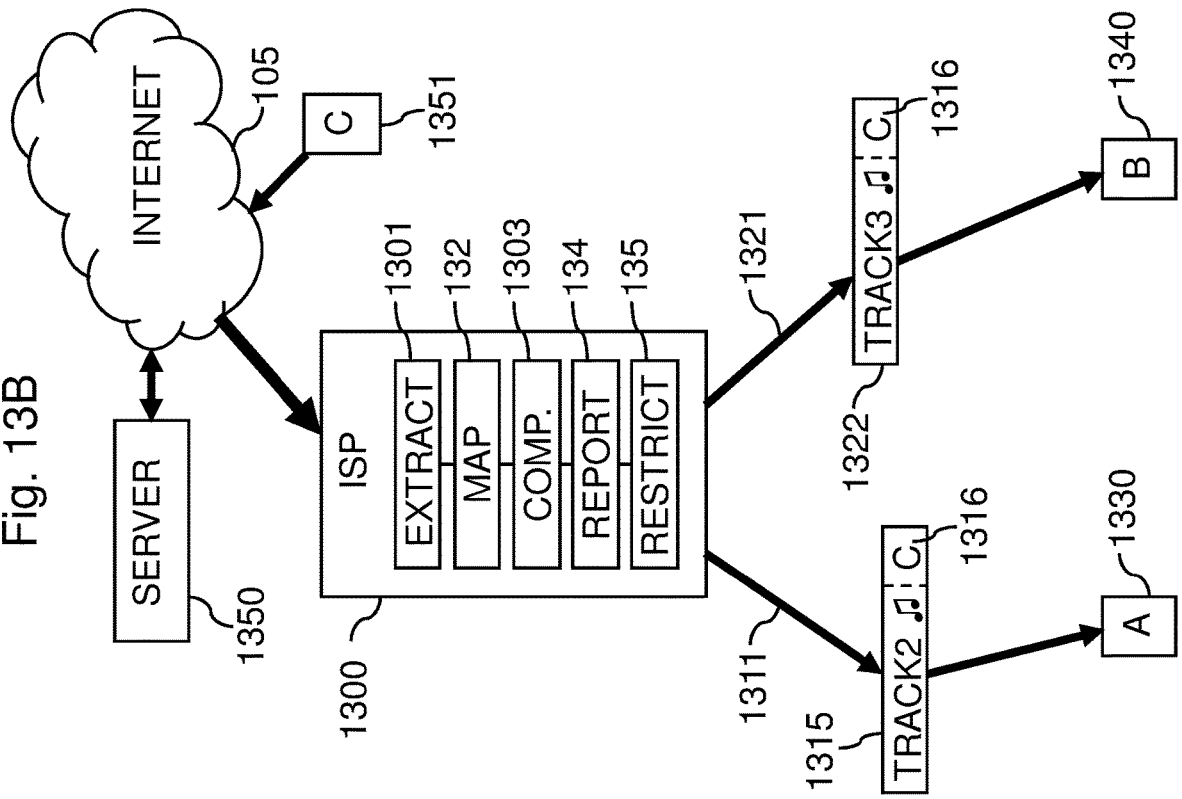
FIG. 13 shows several systems for detecting unauthorised download of content.
Figure 13A:
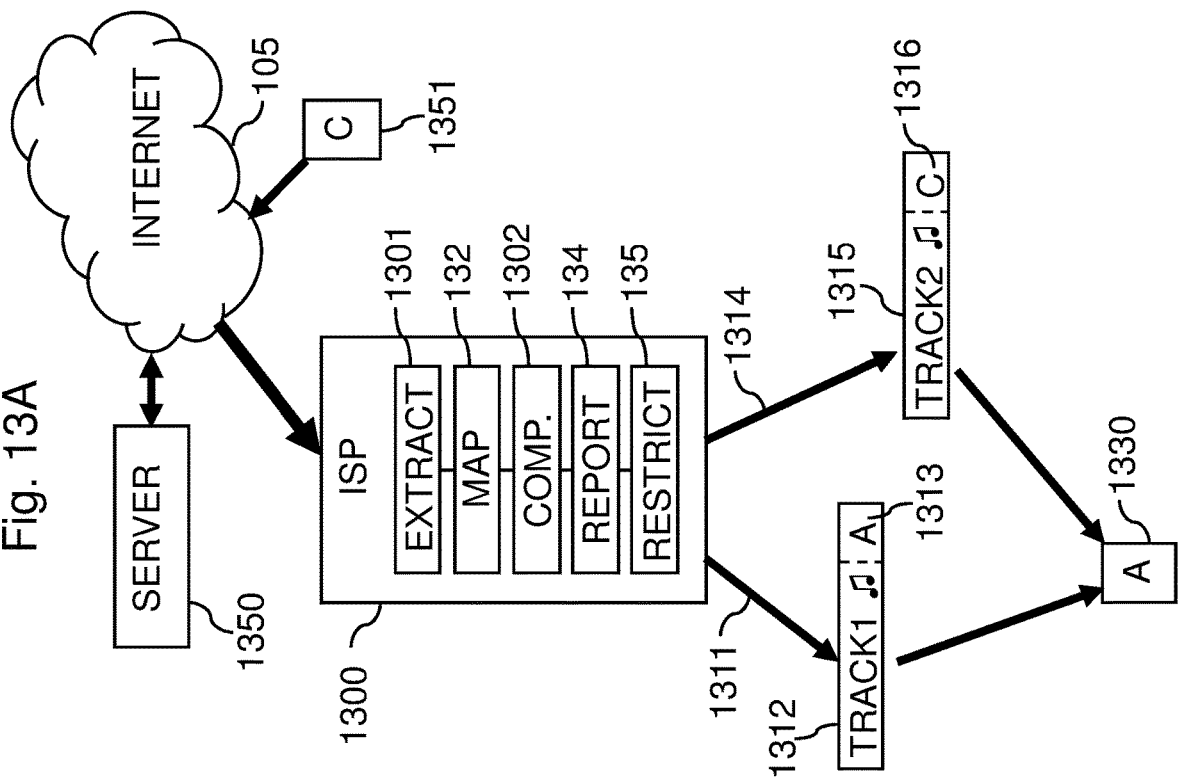

In FIG. 13A, as an example, user A initiates the download of a track 1312 legitimately from a distributor's server (not shown) via the internet 105. The track is sent as a series of data packets from the internet 105 to the ISP 1300. The packets are forwarded on 1311 by the ISP 1300 to the user device downloading (e.g. a laptop) 1330. However, the packets are intercepted within the ISP 1300. The code extractor 1301 reconstitutes the track 1312, which may involve reordering the packets. It may also perform decryption if the tracks are transmitted in encrypted form. The code extractor 1301 then extracts the embedded code from track. The mapper 132 maps this embedded code to the account code 1313 of user A.

At another point in time, user A initiates download of another track 1315 from a device 1351 owned by user C. This may be downloaded directly on a peer to peer basis. Alternatively user C may upload track 1315 to a server 1350, in which case user A downloads track 1315 from server 1350. The packets for track 1315 also pass through user A's ISP 1300. The code extractor 1301 reconstitutes the track 1315 and extracts its embedded code. The mapper maps the embedded code to account code 1316 identifying user C. The comparator 1302 makes a comparison of the two account codes 1313, 1316. As they are associated with different user accounts, but with IP addresses matching the same destination 1330, the comparator 1302 may determine that one or other or both tracks have been (or attempted to be) downloaded without authorisation. If unauthorised download is determined, the restrictor 135 may prevent the track from being forwarded on to the destination. Without limitation, device 1330 may receive an indication of the result of comparator 1302 by virtue that the download does not take place. The reporter 134 may send a report indicating the suspected tracks to the distributor and/or the publisher. For repeated attempts it may also take action against the subscriber, for example by suspending service. The system also works if user A downloads electronic content with two different account codes from two different end-user devices.

Algorithms similar to those in FIGS. 4 and 5 may be employed to determine unauthorised download. If unauthorised download is determined, then the ISP 1300 may alert the distributor of the music. Packets could in fact be intercepted at any point in the internet. Routers could intercept packets which are destined for the same IP address. It could then perform reconstruction, code extraction and mapping as required to determine if music tracks with different account codes are being downloaded from the same IP address.

FIG. 13B shows how unauthorised download can also be determined by comparing the downloads of different subscribers. For example, user A may download 1311 track 1315 marked with the account code 1316 of user C. User B may initiate download 1321 of track 1322 which is also marked with the account code 1316 of User C. Users A and B share the same ISP 1300 which determines that tracks 1315 and 1322 are transmitted to different IP addresses 1330, 1340. The comparator 1303 compares the two account codes marked on the tracks 1315 and 1322 and determines that they are the same. As the same user account is being used to download tracks to different destinations the comparator may determine unauthorised use. The time and/or location of the download may optionally also be taken into account. In this case a time analyser 742 and/or location analyser 743 is incorporated into the comparator 1303. For example if two different user accounts are accessed simultaneously or if the time difference between download is less than the time travel between location, unauthorised use may be determined. These can be useful for detecting unauthorised download at public WIFI hotspots. Algorithms similar to that of FIGS. 8 could be employed. It is also possible for different ISPs to collaborate with one another. Different ISPs may intercept tracks, extract their codes and pool resources with other ISPs.

Figure 14:
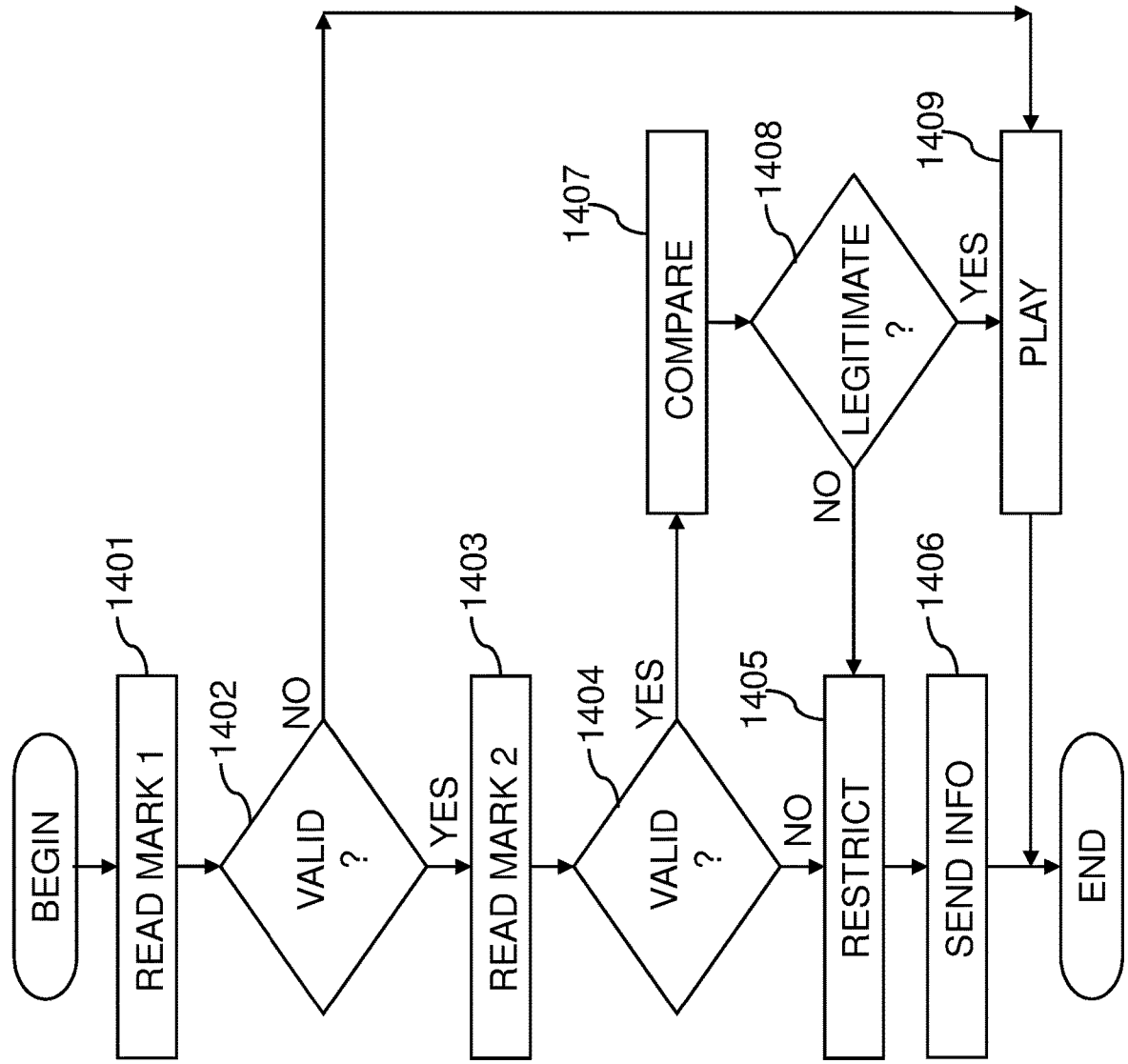
FIG. 14 shows another method for detecting unauthorized content.

FIG. 14 illustrates another embodiment of the present invention. In this embodiment, the content includes a first and second watermark. The first watermark is robust (e.g. embedded in the signal band of the content) and, in this embodiment, is the same for all copies of the content. The first watermark may therefore be embedded off-line (e.g. at the mastering stage) and may have a low data content (e.g. a binary marker).

The second watermark is similar or identical to the markings used in the other embodiments described above. For example, the second watermark may include a payload of data such as the user's account number or timestamp information. The second watermark is therefore copy-dependent, and may be less robust than the first watermark (e.g. embedded outside the signal band), and is typically embedded in real-time at the point of distribution. Both watermarks include checksums to check their validity.

In this embodiment, the content player detects the presence of the first mark. If the first mark is not present, the player determines that the content is unprotected and allows the content to play as normal. The first watermark is read (step 1401). The content player determines if it is valid using the checksum (step 1402). If invalid, the content player allows playback of the content (step 1409) as it means that the content is not watermarked and therefore not protected.

If the first mark is valid, the content player then reads the second mark (step 1403) and determines if it is valid by using the checksum (step 1404). If the second mark is also valid, then the content player uses the data stored in the second watermark to determine if playback of the content is authorized (e.g. by comparing the account code with one stored in memory, or comparing the timestamp with an earlier timestamp stored in memory) (step 1407). If the content player determines the content is authorised (step 1408), the content is allowed to continue playing (step 1409). Otherwise, playback of the content may be restricted (step 1405). Details may also be sent to an external server (step 1406). The content player may also use data stored in the first watermark in the authorization determination step, such as by altering the threshold number of accounts for the particular content.

Figure 15A:
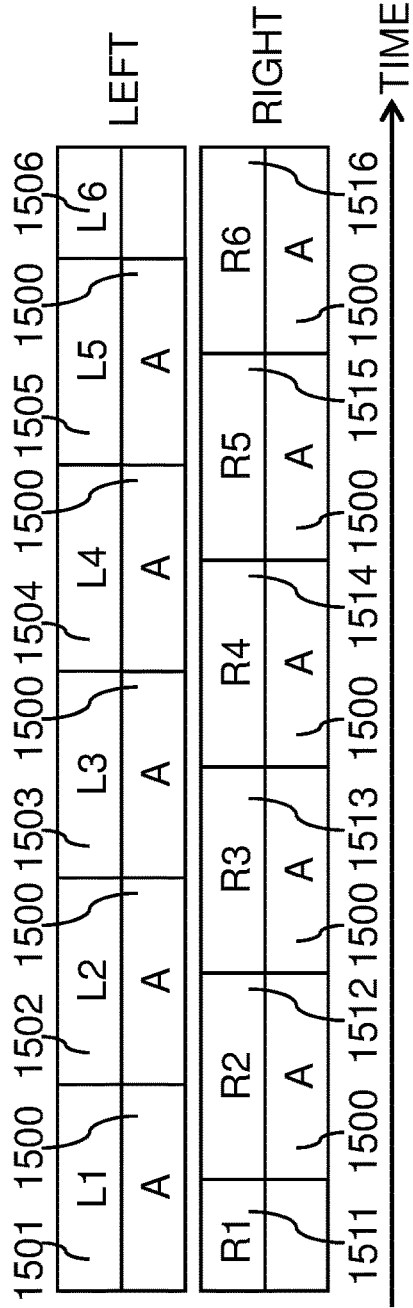
FIGS. 15A and 15B illustrate two further methods for detecting unauthorized content.
Figure 15B:
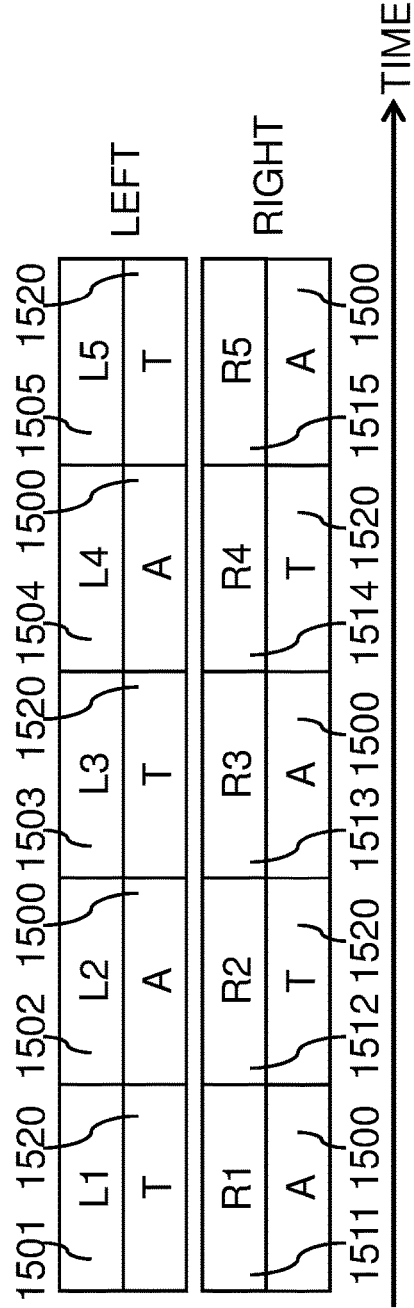

FIGS. 15A and 15B illustrate another embodiment of the present invention. In this embodiment, the content is divided into a first set of blocks (1501-1506) and a second set of blocks (1511-1516). The first and second sets of blocks are for left and right channels respectively and each block therein contains a watermark 1500 representing an account code (though this could equally be a timestamp or any other code used in the invention).

In FIG. 15A, the first and second sets of blocks are offset by half a block. A device playing the content will use the data within a watermark 1500 from either the first or second set of blocks (i.e. from whichever block is received in its entirety first) in determining whether playback of the content is authorized. The skilled person will understand that this may reduce the time taken for this determination when the content isn't played from the beginning, compared to content divided into a single set of blocks.

In FIG. 15B, the first and second sets of blocks contain watermarks encoded two sets of data. In this example, the first block 1501 for the first set of blocks contains a timestamp 1520 whereas the first block 1511 of the second set of blocks contains an account code 1500. The second blocks for the first 1502 and second 1512 sets of blocks contain the account code 1500 and timestamp 1520 respectively, thus alternating the data encoded in the watermark. The skilled person will understand that this effectively doubles the amount of bits/second, and the content player may use either or both sets of data when determining whether the content is authorized. The timestamps 1520 may represent the same time within the same content, or alternatively the timestamps 1520 may increase in time corresponding with the duration of the content as it is streamed.

Figure 16:
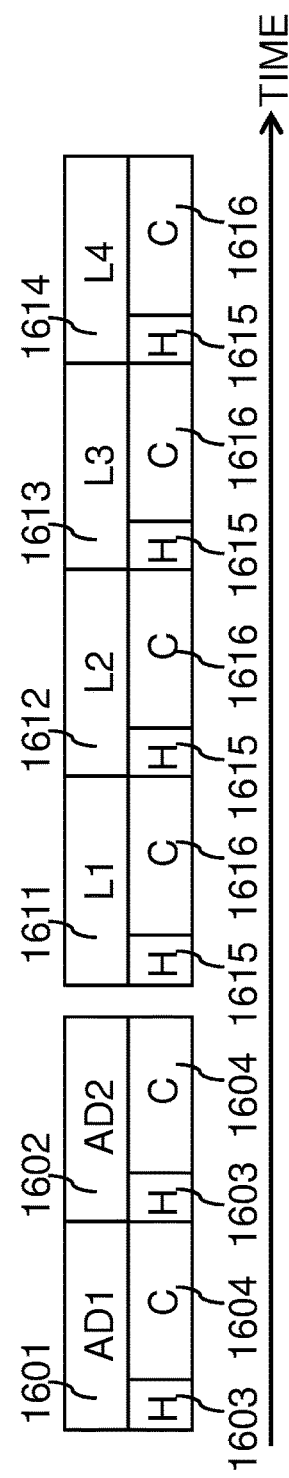
FIGS. 16 and 17 illustrate a method for preventing stripping of advert content from advert-funded content.
Figure 17:
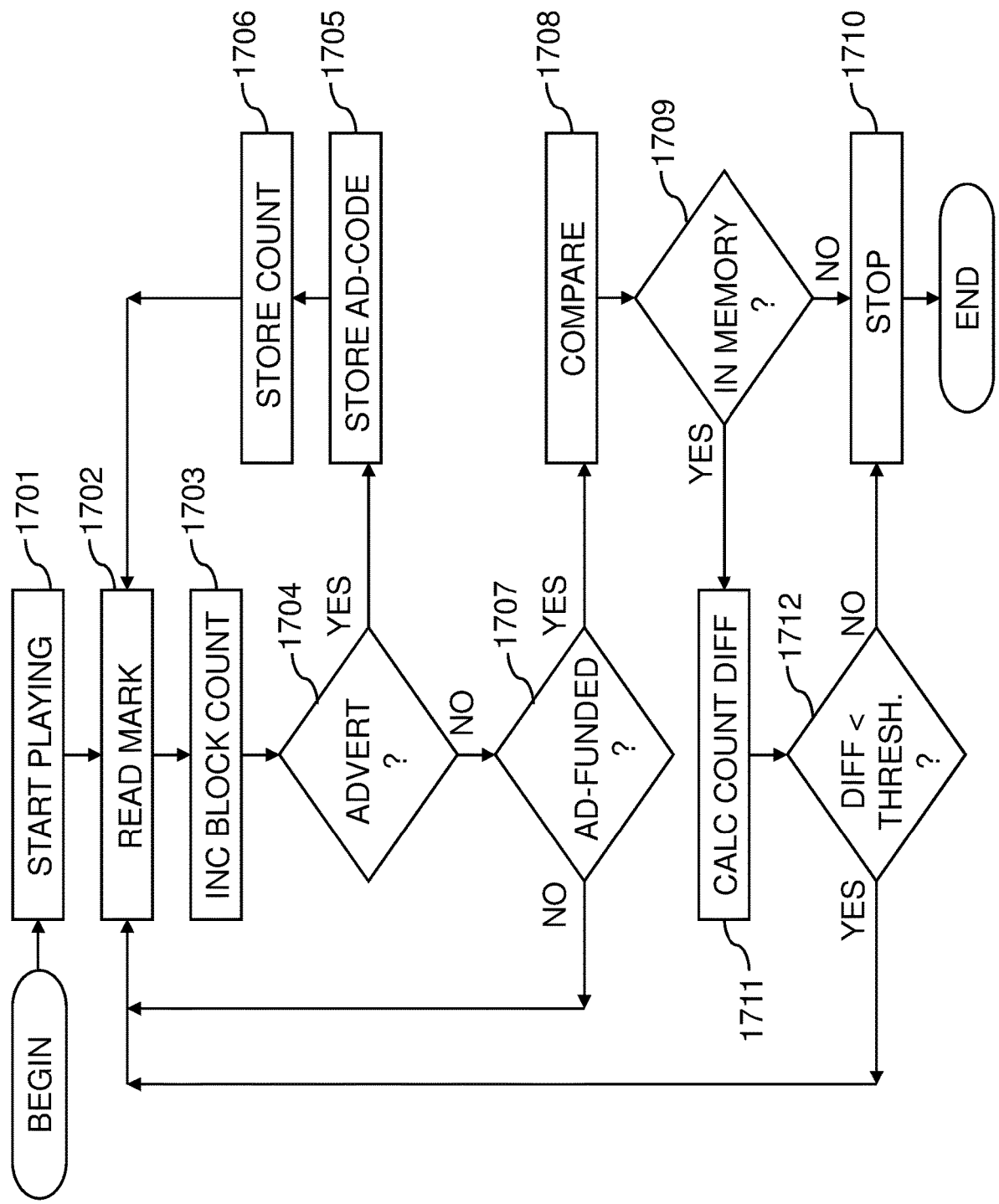

FIGS. 16 and 17 illustrate another embodiment of the present invention. In this embodiment, the content is preceded by an advert (such content is normally referred to as "advert-funded"). There is therefore an advert content, followed by an advert-funded content. The skilled reader will understand that a problem exists in the field in which users strip the advert content from the advert-funded content. FIG. 16 illustrates a solution to this problem.

The advert content is divided into a sequence of blocks, and includes a first two blocks for the advert (1601, 1602). The following advert-funded content has subsequent blocks (1611-1614). The two blocks for the advert include a watermark encoding data with i) a header 1603 identifying these blocks as an advert, and ii) a first advert code 1604. The advert code may be a unique or semi-unique identifier which links the advert to a particular advert-funded content. Different pairings may have different advert codes. The subsequent blocks for the advert-funded content 1611-1614 include a watermark encoding data with i) a header 1615 identifying the content as being advert-funded, and ii) a second advert code 1616. The second advert code would typically be the same as the first advert code. Alternatively the first and second advert code may correspond to a pair or form part of a sequence.

Referring to FIG. 17, when a device plays the content (step 1701), the watermarks from the advert content are detected first (step 1702). The device recognizes that the watermarks relate to an advert from the header 1603 (step 1704) and the advert code 1604 is stored in memory (step 1705). The device also includes a cumulative block count, indicating a running count of the number of blocks read (the block count is incremented in step 1703). The cumulative block count at the time of storing the advert code 1604 is also stored in memory (step 1706).

The device then plays the subsequent blocks for the advert-funded content, and detects the watermarks encoded therein (step 1702). From the watermark header 1615 it detects that the content is advert-funded (as opposed to an advert) in step 1707. The device therefore extracts data identifying the advert code 1616 and compares it to other advert codes in memory (step 1708). It determines whether this advert code 1616 is stored in memory (step 1709). If the advert code extracted 1616 is not in memory, then it means that the advert has been stripped out, so the device will restrict playback (step 1710). In this example, the advert code 1616 matches the advert code 1604 stored in memory. The device therefore determines the number of blocks read since the advert was played (step 1711) by subtracting the cumulative block count from the stored cumulative block count (stored previously in step 1706). If the number of blocks read since the advert was played is less than a threshold, the content may continue playing (step 1712). However, playback is restricted if the number of blocks since the advert was played is greater than a threshold (step 1710).

The advert content and advert-funded content could be joined together, or they could be separate. For example they could be in the same file. The advert content could be interspersed throughout a broadcast of advert-funded content. For example there could be a sequence of first advert content, first advert-funded content, second advert content, second advert funded content etc. Each pair of advert content and advert funded content would have a common advert code, the advert code being different for different pairs. There is no need for the advert and adverted-funded content to be played sequentially. The advert content could for example be an image or video embedded within displayed advert-funded content on a webpage or within a smartphone App.

In an enhancement, the device may keep a running count of the number of blocks within an advert content which have an advert code which relates to the same advert-funded content. The device may then restrict playback of the advert-funded content if this count is below a certain threshold. This prevents someone from just retaining a small portion of the advert content which contains the advert code. Alternatively the device may allow a proportion of adverts to be skipped, to take into account the possibility of switching on a content receiver part way through a broadcast. As an alternative to unique identifiers, the advert codes could form part of a sequence. A sequence of watermarks could be embedded throughout the concatenated chain of advert content and advert-funded content. If the extracted watermarks are read out of sequence it may indicate that the advert content had not been played in its entirety.

In a practical application, watermarks would have a format to allow their meaning to be interpreted. The watermark data may consist of a header, followed by a payload, followed by an error correction code. The header would inform the device of the type of data contained in the payload. The error correction code would be additional data used to correct or detect errors in the watermark recovery. For example a header could have different codes to represent one of the following: an account code, a timestamp, an advert, advert-funded content. It may also convey licence type (e.g. perpetual, one-off, time-limited, advert-funded). It may also determine the format of the payload. For example the payload may represent 10 bits of distributor code followed by 20 bits of account code. In another example, the payload may represent 20 bits of timestamp followed by 10 bits with different time limit options.

As in other embodiments, the thresholds may be encoded in the content watermark, such that the device is updated with the threshold as the content is played. The skilled person will understand that (in all embodiments of this invention), the watermarks could also encode further information. For example, the threshold number of user accounts (either total or for the particular content) may be encoded in the watermark and the device may update accordingly, or settings/keys may be exchanged between devices using watermarks. This watermark may be added to the content itself, or to a dedicated file (e.g. just blank or noise content and the watermark. Instead of using watermarks, an encoded file the DAC does not attempt to play could be sent to change the thresholds, or add settings, algorithms, keys etc.

In some of the above embodiments, the content includes a watermark encoding an account code for the user. However, if the user obtains content from multiple distributors (even legitimately), the account codes will be different and the content player may erroneously determine that the user is not authorized. Accordingly, different distributors may liaise such that the same account code is used for the same user. In another solution, a different or second type of account code is based on a coded version of the user's surname (e.g. hashing). The device may include a first threshold for the number of account codes with the same distributor and a second threshold or the number of different surnames with any distributor.

As with any anti-piracy system, protection against cracking is important. Accordingly, the algorithms needed to decode the watermarks must be kept secure. To improve security, an anti-piracy administrator may have sole access to the algorithms/keys, and content publishers could send unmarked tracks to the anti-piracy administrator for watermarking. Furthermore, the tracks may be watermarked with partial account codes, to make detection more difficult. Thus, different tracks could have different sections of the account code present, with markings indicating which section it contains. Accordingly, if one track is cracked, then all other tracks are not affected. Moreover, different devices could be able to decode different parts of the track.

The skilled person will also understand that the method of the present invention is also applicable to physical content. For example, a CD or DVD may contain a watermark encoding time and/or location information. The content player may then make a determination on whether the user is authorized to play the CD/DVD by comparing the data within the watermark with previously stored data (e.g. if the location information illustrates that the user is playing content from a number of different countries, it may infer that the user has not purchased the music legitimately and is unauthorized).

The skilled person will understand that an electronic device of the present invention may be registered to a particular account code (i.e. a particular account code is stored in memory such that content is allowed to play if it contains a watermark with that code) or a plurality of account codes. The electronic device may have the account code uploaded at the point of sale or when the user registers the device, or the account code may be uploaded to the device (e.g. by an executable configuration file, or a media file containing a watermark). In order to control access, the electronic device (or external server) may restrict the number of account codes which may be uploaded at any one time. It may also restrict the frequency at which registered account codes may be changed to prevent persons from changing the account code every time they play content from someone else's account.

In the above embodiments, data is extracted from the watermarks and mapped to the account code. Although this is not essential (i.e. the mapping is one-to-one), the skilled person will understand that the electronic devices of the present invention may use a plurality of distinct algorithms/keys on individual content until the account code is uncovered.

Other codes may also be embedded within electronic content. For example, a code identifying the distributor may be included. This could allow different distributors to use the same coding scheme without causing conflicts. In another example, different devices could be given their own code, which might be appropriate for online cloud storage services. Instead of using imperceptible digital watermarks to embed the various codes within the electronic content, alternative methods may be used. For example, perceptible watermarks may be used. Alternative methods in which electronic content carry data may be used instead of watermarks. For example, the content may be stored in a digital file and the codes could be stored within the same file, but not form part of the content as such. The codes may or may not be encrypted. Without limitation, the codes could be any representation of the information, including for example an ASCII representation of an identity.

Other methods of obtaining electronic content for comparison may be employed. For example, embedded codes within images on the same webpage or document may be compared to look for mismatches. The interception could also take place within messages and data relayed through a social network or through email. This could be by comparing different electronic content transmitted to the same user and seeing if the codes were different. Alternatively it could be by comparing electronic content transmitted to different users, and seeing if the codes were the same. There are many other additional ways that invention could be employed. Alternatives to electronics may become available for accessing content. The techniques may also be used to protect physical property, for example using ink which is invisible to visible wavelengths.

The first information may be sent in a format understood by the comparator. The second information may be sent in a format understood by the comparator. The system may further comprise a packet generator for providing data packets comprising the first information. The packet generator may provide data packets comprising the second information. The data packets may be transmitted by the first transmitter and/or the second transmitter.

The first electronic content may be different to the second electronic content. The first electronic content and the second electronic content may not be parts of a single electronic content. The first electronic content and the second electronic content may not be parts of a set of electronic content. The first electronic content may be unrelated to the second electronic content. The first electronic content may be one of a plurality of electronic content having the same content as one another, each marked with different information. The second electronic content may be one of a plurality of electronic content having the same content as one another, each marked with different information. The first electronic content may be distributed to its authorised user separately from the second electronic content. The first electronic content and/or second electronic content may be an executable program. The first electronic content and/or second electronic content may be carried by an executable program. The first electronic content and the second electronic content may not be executable programs designed to cooperate with each other. The first electronic content and the second electronic content may not be carried by executable programs designed to cooperate with each other. The first and/or second electronic content may be digital content. The first electronic content and/or second electronic content may be non-transitory.

The first electronic content may be marked with the first information by embedding data within a signal representing the first electronic content. The second electronic content may be marked with the second information by embedding data within a signal representing the second electronic content. The marking may be such that a copy of an electronic content is marked with the same information as the electronic content it was copied from. The marking may be such that a copy of an electronic content is marked with substantially the same information as the electronic content it was copied from. The first information and/or second information may be in a digital form. The mapping may be separate from the first electronic content. The mapping may be separate from the second electronic content. The mapping may be programmable. The mapping may be fixed. The mapping may be one to one. The first information may be dependent on the authorised user of the first electronic content. The second information may be dependent on the authorised user of the second electronic content. Information may be sent by sending an electronic content marked with the information. The content determined as being unauthorised may be the first electronic content and/or the second electronic content.

The comparing function may be within the first electronic content or the second electronic content. The comparing function may be within a program carrying the first electronic content or the second electronic content. The comparison may be carried out within an end-user device. The comparison may be by combining the first electronic content marked with the first information and the second electronic content marked with second information. The comparing function may be non-transitory.

The term 'content' refers to experiences and information that may provide value to an end-user, accessed via a medium. The term 'electronic media' refers to media which use electronics or equivalent technology to access content. The term 'electronic content' refers to content in or accessed via an electronic medium. The term 'digital content' refers to electronic content in a digital format. Examples of electronic media are, without limitation, audio players, video players, television, broadcasting equipment, computers, game consoles, printers, 3D printers, the internet, smartphones, optical disk such as CD or DVD, magnetic disk or tape, electronic memory such as flash memory. Examples of electronic content are, without limitation, audio recordings, video recordings, live broadcasts, digital or digitised photographs, electronic artwork, electronic books, video games or any other media file. Electronic content may exist as executable computer programs (for example video games or smartphone applications (i.e. "Apps")) or as non-executable, non-programmed data/signals (for example audio, video, electronic books).

In the above embodiments, a restriction may be applied to the content if it is determined that the user is not authorized. For example, a track may be prevented from playing or the quality of the track may be reduced. The term 'restriction' therefore encompasses any form of limitation or control imposed on the unauthorized content.

The term 'marked' refers to all ways in which electronic content may contain additional information to protect against unauthorised use. Without limitation, this includes digital watermarks, digital steganography, modulation of signals or data representing content, inserting additional data into electronic files containing electronic content, inserting additional data into programs carrying electronic content, inserting additional data into executable electronic content. Electronic content may be marked with information by marking it with data which maps to the information, without including the mapping scheme. The meaning of the information may be changed by changing the mapping scheme retrospectively. Marking does not include IP addresses or other data which are only temporarily appended to data packets for the purpose of transmission through a network.

Various changes and alterations can be made without departing from the broader aspects and spirit of the invention. Any value or range provided may be substituted for another in order to achieve the desired results. Where the singular is used (for example 'an', 'a', 'the', 'this'), it is taken be one or more items. Where the word 'comprising' is used, it is taken to include the succeeding method steps and/or elements, but may also include additional method steps and/or elements. The steps described in the methods herein may be carried out in any order or simultaneously. Individual steps or groups of steps may be removed from any of the methods without losing the desired effect. Individual elements or groups of elements may be removed from any of the apparatus without losing the desired effect. Parts of any of the examples may be combined with parts of any other examples in order to gain advantage. Where an element or step is stated to be optional, it should not be taken to imply that other elements or steps are essential. Each element and each step may be implemented as a software or hardware module.

The skilled person will understand that any combination of features is possible within the scope of the invention, as claimed.

The invention claimed is:

1. A system for authorizing performance of content, the system comprising:
   at least one processor;
   wherein the processor, or one of the processors if more than one, is configured for receiving a first copy of content, wherein the first copy of content is watermarked with first data;
   wherein the processor, or one of the processors if more than one, is configured for receiving a second copy of content, wherein the second copy of content is watermarked with second data, wherein the first copy of content and the second copy of content are different and independent of each other, wherein the first data and the second data relate to one or more of: time, sequence of download, order of access, an authorized user, and an advert;
   wherein the processor, or one of the processors if more than one, is configured for extracting the first data from the first copy of content;
   wherein the processor, or one of the processors if more than one, is configured for extracting the second data from the second copy of content;
   wherein the processor, or one of the processors if more than one, is configured to make a comparison by comparing the second data with at least the first data;
   wherein the processor, or one of the processors if more than one, is configured to determine that performance of the second copy of content is authorized if the comparison meets a predetermined condition; and
   wherein the processor, or one of the processors if more than one, is configured for one or more of:
   performing the second copy of content if the predetermined condition is met;
   applying a restriction to the performance of the second copy of content if the predetermined condition is not met;
   issuing a warning if the predetermined condition is not met; and
   sending a report to an external server if the predetermined condition is not met.

2. The system according to claim 1, wherein the first data is within an imperceptible digital watermark in the first copy of content and the second data is within an imperceptible digital watermark in the second copy of content.

3. The system according to claim 1, wherein the first and second data relate to a first and second account code respectively, the first account code being associated with an authorized user of the first copy of content and the second account code being associated with an authorized user of the second copy of content;
   wherein the processor which is configured for determining that the second copy of content is authorized for performance, is configured for one or both of:
   the predetermined condition is met if the first and second account codes match; and
   the predetermined condition is met if the first and second account codes do not match but come from copies of content accessed by different devices at the same time.

4. The system according to claim 1, wherein the first and second copies of content are characterized by one or more of:
   the first copy of content and the second copy of content have different content; the first data and the second data are different; the first copy of content is unrelated to the second copy of content.

5. The system according to claim 1,
   wherein the first copy of content and the second copy of content are each one of: an audio file, a video file, a digital photograph, an electronic artwork, an electronic book, and a video game.

6. The system according to claim 1, the system further comprising:
   a server, the server configured for one or more of:
   embedding the first data in the first copy of content;
   embedding the second data in the second copy of content;
   distributing the first copy of content; and
   distributing the second copy of content.

7. The system according to claim 1, the system further comprising one or more of:
   the first copy of content in electronic or optical media; and
   the second copy of content in electronic or optical media.

8. An electronic device for authorizing performance of content, the electronic device comprising:
   a processor;
   wherein the processor is configured for receiving a first copy of content and a second copy of content, wherein the first copy of content is watermarked with first data and the second copy of content is watermarked with second data, wherein the first copy of content and the second copy of content are different and independent of each other, wherein the first data and the second data relate to one or more of: time, sequence of download, order of access, an authorized user, and an advert;
   wherein the processor is configured for extracting the first data from the first copy of content and the second data from the second copy of content;
   wherein the processor is configured to make a comparison by comparing the second data with at least the first data;
   wherein the processor is configured to determine that performance of the second copy of content is authorized if the comparison meets a predetermined condition;
   wherein the processor is configured for one or more of:
   performing the second copy of content if the predetermined condition is met;
   applying a restriction to the performance of the second copy of content if the predetermined condition is not met;
   issuing a warning if the predetermined condition is not met; and
   sending a report to an external server if the predetermined condition is not met.

9. An electronic device according to claim 8, the electronic device further comprising:
a non-volatile memory store;
wherein the processor is configured for receiving a plurality of further copies of content, wherein each further copy of content is watermarked with further data, wherein each further copy of content is different and independent of one another, wherein the first copy of content is one of the further copies of content;
wherein the processor is configured for extracting further data from each further copy of content; wherein the second data relates to a second account code and the further data relates to further account codes, each account code being associated with an authorized user of the corresponding copy of content;
wherein the processor is configured for storing the further account codes in the non-volatile memory store;
wherein the processor is configured to make the comparison by comparing the second account code with the further account codes;
wherein the predetermined condition is met if the number of different second and further account codes is lower than a predetermined threshold.

10. An electronic device according to claim 8, wherein the second copy of content is received after the first copy of content; wherein the first data and the second data relate to a first sequenced data entry and a second sequenced data entry respectively;
wherein the processor is configured for one or both of:
the predetermined condition is met if the second sequenced data entry is later in sequence than the first sequenced data entry; and
the predetermined condition is met if the second sequenced data entry is within a predetermined maximum range in sequence of the first sequenced data entry.

11. An electronic device according to claim 10, wherein the first sequenced data entry relates to a time of download of the first copy of content and the second sequenced data entry relates to a time of download of the second copy of content.

12. An electronic device according to claim 8, wherein the first copy of content and the second copy of content are characterized by one or more of:
the first copy of content and the second copy of content have different content;
the first data and the second data are different; and
the first copy of content and the second copy of content are unrelated.

13. An electronic device according to claim 8, wherein the first copy of content relates to an advert, the first data relates to a first advert code and the second data relates to a second advert code;
wherein the processor is configured for any one or more of:
the predetermined condition is met if the first advert code and the second advert code match;
the predetermined condition is met if the first advert code and the second advert code correspond to a pair; and
the predetermined condition is met if the first advert code and the second advert code form part of a sequence.

14. An electronic device according to claim 8, wherein the first data is within an imperceptible digital watermark in the first copy of content and the second data is within an imperceptible digital watermark in the second copy of content.

15. An electronic device according to claim 8, further comprising:
a digital input port, coupled to the processor;
an analog output port;
a converter, coupled to the processor and the analog output port, for converting digital signals to analog signals;
wherein the processor is configured for receiving the first and second copies of content from the digital input port;
wherein the processor is configured to restrict the output of the analog signal on the analog output port if the predetermined condition is not met.

16. An electronic device according to claim 8, wherein the electronic device is a content player for performing received content;
wherein the processor is configured for receiving the first and second copies of content from: an internal memory store and/or an external memory store and/or an external interface; and
wherein the processor is configured to perform the second copy of content if the predetermined condition is met;
wherein the processor is configured to apply a restriction to the performance of the second copy of content if the predetermined condition is not met.

17. An electronic device according to claim 8, the electronic device further comprising:
a non-volatile memory store;
wherein the processor is configured for receiving a plurality of further copies of content, wherein each further copy of content is watermarked with further data, wherein each further copy of content is different and independent of one another, wherein the first copy of content is one of the further copies of content;
wherein the processor is configured for extracting the further data from each further copy of content; wherein the second data relates to a second identifier and the further data relates to further identifiers, each identifier being unique or statistically unique;
wherein the processor is configured for storing the further identifiers in the non-volatile memory store;
wherein the processor is configured to make the comparison by comparing the second identifier with the further identifiers;
wherein the predetermined condition is met if the second identifier does not match any of the further identifiers.

18. A method of authorizing performance of content, implemented with at least one processor, the method comprising the steps of:
receiving a first copy of content, wherein the first copy of content is watermarked with first data;
extracting the first data from the first copy of content;
receiving a second copy of content, wherein the second copy of content is watermarked with second data, wherein the first copy of content and the second copy of content are different and independent of each other, wherein the first data and the second data relate to one or more of: time, sequence of download, order of access, an authorized user, and an advert;
extracting the second data from the second copy of content;
making a comparison by comparing the second data with at least the first data;
determining that performance of the second copy of content is authorized if the comparison meets a predetermined condition;

determining that performance of the second copy of content is unauthorized if the predetermined condition is not met; and one or more of the following steps:

performing the second copy of content if the predetermined condition is met;

applying a restriction to the performance of the second copy of content if the predetermined condition is not met;

issuing a warning if the predetermined condition is not met; and sending a report to an external server if the predetermined condition is not met.

19. The method according to claim 18, wherein the second copy of content is received after the first copy of content, wherein the first data and the second data relate to a first and a second sequenced data entry respectively, the method further comprising one or both of:

the predetermined condition is met if the second sequenced data entry is later in sequence than the first sequenced data entry; and the predetermined condition is met if the second sequenced data entry is within a predetermined maximum range in sequence of the first sequenced data entry.

20. The method according to claim 19, wherein the first sequenced data entry relates to a time of download of the first copy of content and the second sequenced data entry relates to a time of download of the second copy of content.

21. The method according to claim 18, wherein the first copy of content and the second copy of content are characterized by one or more of:

the first copy of content and the second copy of content have different content;

the first data and the second data are different; and the first copy of content and the second copy of content are unrelated.

22. The method according to claim 18, wherein the first copy of content relates to an advert, the first data relates to a first advert code and the second data relates to a second advert code; the method further comprising any one or more of:

the predetermined condition is met if the first and second advert codes match;

the predetermined condition is met if the first and second advert codes correspond to a pair; and the predetermined condition is met if the first and second advert codes form part of a sequence.

23. The method according to claim 18, wherein the first data is within an imperceptible digital watermark in the first copy of content and/or the second data is within an imperceptible digital watermark in the second copy of content.

24. The method according to claim 18, further comprising the steps of:

receiving a plurality of further copies of content, wherein each further copy of content is watermarked with further data, wherein each further copy of content is different and independent of one another, wherein the first copy of content is one of the further copies of content;

extracting further data from each further copy of content, wherein the second data relates to a second account code and the further data relates to further account codes, each second and further account code being associated with an authorized user of the corresponding copy of content;

storing the further account codes;

wherein the step of making a comparison comprises comparing the second account code with the further account codes;

wherein the predetermined condition is met if the number of different second and further account codes is less than a predetermined threshold.

25. The method according to claim 18, the method additionally comprising one or more of the following steps:

embedding the first data in the first copy of content;

distributing the first copy of content;

embedding the second data in the second copy of content; and distributing the second copy of content.

26. The method according to claim 18, the method comprising the steps of:

If the predetermined condition is met, performing the second copy of content;

If the predetermined condition is not met, restricting performance of the second copy of content.

27. The method according to claim 18, the method further comprising the following steps:

receiving a plurality of further copies of content, wherein each further copy of content is watermarked with further data, wherein each further copy of content is different and independent of one another, wherein the first copy of content is one of the further copies of content;

extracting the further data from each further copy of content; wherein the second data relates to a second identifier and the further data relate to further identifiers, each identifier being unique or statistically unique;

storing the further identifiers;

where the step of making a comparison is by comparing the second identifier with the further identifiers;

wherein the predetermined condition is met if the second identifier does not match any of the further identifiers.

* * * * *